(12) United States Patent
Lee

(10) Patent No.: US 7,076,105 B2
(45) Date of Patent: Jul. 11, 2006

(54) CIRCUIT AND METHOD FOR PERFORMING A TWO-DIMENSIONAL TRANSFORM DURING THE PROCESSING OF AN IMAGE

(75) Inventor: Woobin Lee, Lynnwood, WA (US)

(73) Assignee: Equator Technologies Inc., Campbell, CA (US)

( * ) Notice: Subject to any disclaimer, the term of this patent is extended or adjusted under 35 U.S.C. 154(b) by 658 days.

(21) Appl. No.: 09/782,509

(22) Filed: Feb. 12, 2001

(65) Prior Publication Data

US 2002/0021842 A1    Feb. 21, 2002

Related U.S. Application Data

(63) Continuation-in-part of application No. PCT/US99/18533, filed on Aug. 13, 1999.

(60) Provisional application No. 60/096,534, filed on Aug. 13, 1998.

(51) Int. Cl.
*G06K 9/36* (2006.01)
(52) U.S. Cl. ...................................... 382/233; 382/232
(58) Field of Classification Search ........ 382/232–236, 382/239–250; 375/240.25
See application file for complete search history.

(56) References Cited

U.S. PATENT DOCUMENTS 5,995,080 A    11/1999    Biro et al.

OTHER PUBLICATIONS

W.H. Chen, et al., "A Fast Computational Algorithm for the Discrete Cosine Transform", IEEE Transactions on Communications, vol. COM-25, No. 9, Sep., 1977, pp. 1004-1009.

T. Masaki, et al., "VLSI Implementation of Inverse Discrete Cosine Transformer and Motion Compensator for MPEG2 HDTV Video Decoding", IEEE Transactions on Circuits And Systems for Video Technology, vol. 5, No. 5, Oct., 1995, pp. 387-395.

W. Lee, "Architectures and Algorithms for MPEG Video Coding", Ph.D. Dissertation, University of Washington, Seattle, WA, 1997.

*Primary Examiner*—Duy M Dang
(74) *Attorney, Agent, or Firm*—Marger Johnson & McCollom P.C.

(57) ABSTRACT

An image decoder performs a 2-D transform as a series of 1-D transforms, and does so in a more efficient manner than prior decoders. The decoder includes a memory and a processor coupled to the memory. The processor is operable to store a column of values in the memory as a row of values, combine the values within the stored row to generate a column of resulting values, and store the resulting values in the memory as a row of resulting values. Such an image decoder can store values in a memory register such that when the processor combines these values to generate intermediate IDCT values, it stores these intermediate IDCT values in a transposed fashion. Thus, such an image decoder reduces the image-processing time by combining the generating and transposing of the intermediate IDCT values into a single step. The image decoder can store the values in a memory register such that when the processor combines these values to generate the intermediate IDCT values, it stores these intermediate IDCT values in a transposed and even-odd-separated fashion. Thus, such an image decoder reduces the image-processing time by combining the generating, transposing, and even-odd separating of the intermediate IDCT values into a single step.

52 Claims, 16 Drawing Sheets

$$\begin{array}{cccccccc}
D_{07} & D_{06} & D_{05} & D_{04} & D_{03} & D_{02} & D_{01} & D_{00} \\
D_{17} & D_{16} & D_{15} & D_{14} & D_{13} & D_{12} & D_{11} & D_{10} \\
\vdots & & & & & & & \vdots \\
D_{77} & D_{76} & D_{75} & D_{74} & D_{73} & D_{72} & D_{71} & D_{70}
\end{array}$$

*Fig. 3 (PRIOR ART)*

$$\begin{array}{cccccccc}
I_{07} & I_{06} & I_{05} & I_{04} & I_{03} & I_{02} & I_{01} & I_{00} \\
I_{17} & I_{16} & I_{15} & I_{14} & I_{13} & I_{12} & I_{11} & I_{10} \\
\vdots & & & & & & & \vdots \\
I_{77} & I_{76} & I_{75} & I_{74} & I_{73} & I_{72} & I_{71} & I_{70}
\end{array}$$

*Fig. 6 (PRIOR ART)*

$$
\begin{array}{|cccccccc|}
\hline
I'_{70} & I'_{60} & I'_{50} & I'_{40} & I'_{30} & I'_{20} & I'_{10} & I'_{00} \\
I'_{71} & I'_{61} & I'_{51} & I'_{41} & I'_{31} & I'_{21} & I'_{11} & I'_{01} \\
\vdots & & & & & & & \vdots \\
I'_{77} & I'_{67} & I'_{57} & I'_{47} & I'_{37} & I'_{27} & I'_{17} & I'_{07} \\
\hline
\end{array}
$$

*Fig. 9 (PRIOR ART)*

$$
\begin{array}{|cccccccc|}
\hline
I'_{70} & I'_{50} & I'_{30} & I'_{10} & I'_{60} & I'_{40} & I'_{20} & I'_{00} \\
I'_{71} & I'_{51} & I'_{31} & I'_{11} & I'_{61} & I'_{41} & I'_{21} & I'_{01} \\
\vdots & & & & & & & \vdots \\
I'_{77} & I'_{57} & I'_{37} & I'_{17} & I'_{67} & I'_{47} & I'_{27} & I'_{07} \\
\hline
\end{array}
$$

*Fig. 10 (PRIOR ART)*

CIRCUIT AND METHOD FOR PERFORMING A TWO-DIMENSIONAL TRANSFORM DURING THE PROCESSING OF AN IMAGE

This is a continuation-in-part of co-pending International Application PCT/US99/18533 filed on Aug. 13, 1999 designating the United States and claims the benefit of Provision Application No. 60/096,534, filed Aug. 13, 1998.

TECHNICAL FIELD

The invention relates generally to image processing circuits and techniques, and more particularly to a circuit and method for performing a two-dimensional transform, such as an Inverse-Discrete-Cosine-Transform (IDCT), during the processing of an image. Such a circuit and method can perform an IDCT more efficiently than prior circuits and methods.

BACKGROUND OF THE INVENTION

It is often desirable to decrease the complexity of an image processor that compresses or decompresses image data. Because image data is often arranged in two-dimensional (2-D) blocks, the processor often executes 2-D mathematical functions to process the image data. Unfortunately, a processor having a relatively complex architecture is typically required to execute these complex image-processing functions. The complex architecture often increases the size of the processor's arithmetic unit and its internal data busses, and thus often increases the cost and overall size of the processor as compared to standard processors.

One technique for effectively reducing the complexity of an image processor's architecture is to break down the complex image-processing functions into a series of simpler functions that a simpler architecture can handle. For example, a paper by Masaki et al., which is incorporated by reference, discloses a technique for breaking down an 8-point vector multiplication into a series of 4-point vector multiplications to simplify a 2-D IDCT. *VLSI Implementation of Inversed Discrete Cosine Transformer and Motion Compensator for MPEG2 HDTV Video Decoding*, IEEE Transactions On Circuits And Systems For Video Technology, Vol. 5, No. 5, October, 1995.

Unfortunately, although such a technique allows the processor to have a simpler architecture, it often increases the time that the processor needs to process the image data. Thus, the general rule is that the simpler the processor's architecture, the slower the processing time, and the more complex the processor's architecture, the faster the processing time.

To help the reader understand the concepts discussed above and those discussed below in the Description of the Invention, following is a basic overview of conventional image compression/decompression techniques, the 2-D DCT function and the 2-D and 1-D IDCT functions, and a discussion of Masaki's technique for simplifying the 1-D IDCT function.

Overview of Conventional Image-Compression/Decompression Techniques

To electronically transmit a relatively high-resolution image over a relatively low-band-width channel, or to electronically store such an image in a relatively small memory space, it is often necessary to compress the digital data that represent the image. Such image compression typically involves reducing the number of data bits that are necessary to represent an image. For example, High-Definition-Television (HDTV) video images are compressed to allow their transmission over existing television channels. Without compression, HDTV video images would require transmission channels having bandwidths much greater than the bandwidths of existing television channels. Furthermore, to reduce data traffic and transmission time to acceptable levels, one may compress an image before sending it over the internet. Or, to increase the image-storage capacity of a CD-ROM or server, one may compress an image before storing it.

Referring to FIGS. 1A–6, the basics of the popular block-based Moving Pictures Experts Group (MPEG) compression standards, which include MPEG-1 and MPEG-2, are discussed. For purposes of illustration, the discussion is based on using an MPEG 4:2:0 format to compress video images represented in a Y-$C_B$-$C_R$ color space. However, the discussed concepts also apply to other MPEG formats, to images that are represented in other color spaces, and to other block-based compression standards such as the Joint Photographic Experts Group (JPEG) standard, which is often used to compress still images. Furthermore, although many details of the MPEG standards and the Y-$C_B$-$C_R$ color space are omitted for brevity, these details are well known and are disclosed in a large number of available references.

Referring to FIGS. 1A–1D, the MPEG standards are often used to compress temporal sequences of images—video frames for purposes of this discussion—such as found in a television broadcast. Each video frame is divided into sub-regions called macro blocks, which each include one or more pixels. FIG. 1A is a 16-pixel-by-16-pixel macro block 10 having 256 pixels 12 (not drawn to scale). The macro block 10 may have other dimensions as well. In the original video frame, i.e., the frame before compression, each pixel 12 has a respective luminance value Y and a respective pair of color-, i.e., chroma-, difference values $C_B$ and $C_R$ ("B" indicates "Blue" and "R" indicates "Red").

Before compression of the video frame, the digital luminance (Y) and chroma-difference ($C_B$ and $C_R$) values that will be used for compression, i.e., the pre-compression values, are generated from the original Y, $C_B$, and $C_R$ values of the original frame. In the MPEG 4:2:0 format, the pre-compression Y values are the same as the original Y values. Thus, each pixel 12 merely retains its original luminance value Y. But to reduce the amount of data to be compressed, the MPEG 4:2:0 format allows only one pre-compression $C_B$ value and one pre-compression $C_R$ value for each group 14 of four pixels 12. Each of these pre-compression $C_B$ and $C_R$ values are respectively derived from the original $C_B$ and $C_R$ values of the four pixels 12 in the respective group 14. For example, a pre-compression $C_B$ value may equal the average of the original $C_B$ values of the four pixels 12 in the respective group 14. Thus, referring to FIGS. 1B–1D, the pre-compression Y, $C_B$, and $C_R$ values generated for the macro block 10 are arranged as one 16×16 matrix 16 of pre-compression Y values (equal to the original Y values of the pixels 12), one 8×8 matrix 18 of pre-compression $C_B$ values (equal to one derived $C_B$ value for each group 14 of four pixels 12), and one 8×8 matrix 20 of pre-compression $C_R$ values (equal to one derived $C_R$ value for each group 14 of four pixels 12). The matrices 16, 18, and 20 are often called "blocks" of values. Furthermore, because the MPEG standard requires one to perform the compression transforms on 8×8 blocks of pixel values instead of on 16×16 blocks, the block 16 of pre-compression Y values is subdivided into four 8×8 blocks 22a–22d, which respectively correspond to the 8×8 pixel blocks A–D in the macro block 10. Thus, referring to FIGS. 1A–1D, six 8×8 blocks of pre-compression pixel data are generated for each macro block 10: four 8×8 blocks 22a–22d of pre-compression Y values, one 8×8 block 18 of pre-compression $C_B$ values, and one 8×8 block 20 of pre-compression $C_R$ values.

FIG. 2 is a block diagram of an MPEG compressor 30, which is more commonly called an encoder. Generally, the encoder 30 converts the pre-compression data for a frame or sequence of frames into encoded data that represent the same frame or frames with significantly fewer data bits than the pre-compression data. To perform this conversion, the encoder 30 reduces or eliminates redundancies in the pre-compression data and reformats the remaining data using efficient transform and coding techniques.

More specifically, the encoder 30 includes a frame-reorder buffer 32, which receives the pre-compression data for a sequence of one or more video frames and reorders the frames in an appropriate sequence for encoding. Typically, the reordered sequence is different than the sequence in which the frames are generated and will be displayed. The encoder 30 assigns each of the stored frames to a respective group, called a Group Of Pictures (GOP), and labels each frame as either an intra (I) frame or a non-intra (non-I) frame. For example, each GOP may include three I frames and twelve non-I frames for a total of fifteen frames. The encoder 30 always encodes the macro blocks of an I frame without reference to another frame, but can and often does encode the macro blocks of a non-I frame with reference to one or more of the other frames in the GOP. The encoder 30 does not, however, encode the macro blocks of a non-I frame with reference to a frame in a different GOP.

Referring to FIGS. 2 and 3, during the encoding of an I frame, the 8×8 blocks (FIGS. 1B–1D) of the pre-compression Y, $C_B$, and $C_R$ values that represent the I frame pass through a summer 34 to a Discrete Cosine Transformer (DCT) 36, which transforms these blocks of pixel values into respective 8×8 blocks of one DC (zero frequency) transform value $D_{00}$ and sixty-three AC (non-zero frequency) transform values $D_{01}$–$D_{77}$. Referring to FIG. 3, these DCT transform values are arranged in an 8×8 transform block 37, which corresponds to a block of pre-compression pixel values such as one of the pre-compression blocks of FIGS. 1B–1D. For example, the block 37 may include the luminance transform values $D_{Y00}$–$D_{Y77}$ that correspond to the pre-compression luminance values $Y_{(0,0)A}$–$Y_{(7,7)A}$ in the pre-compression block 22a of FIG. 1B. Furthermore, the pre-compression Y, $C_B$, and $C_R$ values pass through the summer 34 without being summed with any other values because the encoder 30 does not use the summer 34 for encoding an I frame. As discussed below, however, the encoder 30 uses the summer 34 for motion encoding macro blocks of a non-I frame.

Referring to FIGS. 2 and 4, a quantizer and zigzag scanner 38 limits each of the transform values D from the DCT 36 to a respective maximum value, and provides the quantized AC and DC transform values on respective paths 40 and 42 in a zigzag pattern. FIG. 4 is an example of a zigzag scan pattern 43, which the quantizer and zigzag scanner 38 may implement. Specifically, the quantizer and zigzag scanner 38 provides the transform values D from the transform block 37 (FIG. 3) on the respective paths 40 and 42 in the order indicated. That is, the quantizer and scanner 38 first provides the transform value D in the "0" position, i.e, $D_{00}$, on the path 42. Next, the quantizer and scanner 38 provides the transform value D in the "1" position, i.e., $D_{01}$, on the path 40. Then, the quantizer and scanner 38 provides the transform value D in the "2" position, i.e., $D_{10}$, on the path 40, and so on until at last it provides the transform value D in the "63" position, i.e., $D_{77}$, on the path 40. Such a zigzag scan pattern decreases the number of bits needed to represent the encoded image data, and thus increases the coding efficiency of the encoder 30. Although a specific zigzag scan pattern is discussed, the quantizer and scanner 38 may scan the transform values using other scan patterns depending on the coding technique and the type of images being encoded.

Referring again to FIG. 2, a prediction encoder 44 predictively encodes the DC transform values, and a variable-length coder 46 converts the quantized AC transform values and the quantized and predictively encoded DC transform values into variable-length codes such as Huffman codes. These codes form the encoded data that represent the pixel values of the encoded I frame.

A transmit buffer 48 temporarily stores these codes to allow synchronized transmission of the encoded data to a decoder (discussed below in conjunction with FIG. 5). Alternatively, if the encoded data is to be stored instead of transmitted, the coder 46 may provide the variable-length codes directly to a storage medium such as a CD-ROM.

A rate controller 50 ensures that the transmit buffer 48, which typically transmits the encoded frame data at a fixed rate, never overflows or empties, i.e., underflows. If either of these conditions occurs, errors may be introduced into the encoded data stream. For example, if the buffer 48 overflows, data from the coder 46 is lost. Thus, the rate controller 50 uses feedback to adjust the quantization scaling factors used by the quantizer and zigzag scanner 38 based on the degree of fullness of the transmit buffer 48. Specifically, the fuller the buffer 48, the larger the controller 50 makes the scale factors, and the fewer data bits the coder 46 generates. Conversely, the more empty the buffer 48, the smaller the controller 50 makes the scale factors, and the more data bits the coder 46 generates. This continuous adjustment ensures that the buffer 48 neither overflows nor underflows.

Still referring to FIG. 2, the encoder 30 uses a dequantizer and inverse zigzag scanner 52, an inverse DCT 54, a summer 56, a reference frame buffer 58, and a motion predictor 60 to motion encode macro blocks of non-I frames.

FIG. 5 is a block diagram of a conventional MPEG decompresser 62, which is commonly called a decoder and which can decode frames that are encoded by the encoder 30 of FIG. 2.

Referring to FIGS. 5 and 6, for I frames and macro blocks of non-I frames that are not motion predicted, a variable-length decoder 64 decodes the variable-length codes received from the encoder 30. A prediction decoder 66 decodes the predictively encoded DC transform values, and a dequantizer and inverse zigzag scanner 67, which is similar or identical to the dequantizer and inverse scanner 52 of FIG. 2, dequantizes and rearranges the decoded AC and DC transform values. An inverse DCT 68, which is similar or identical to the inverse DCT 54 of FIG. 2, transforms the dequantized transform values into inverse transform (IDCT) values, i.e., recovered pixel values. FIG. 6 is an 8×8 inverse-transform block 70 of inverse transform values $I_{00}$–$I_{77}$, which the inverse DCT 68 generates from the block 37 of transform values $D_{00}$–$D_{77}$ (FIG. 3). For example, if the block 37 corresponds to the block 22a of pre-compression luminance values $Y_A$ (FIG. 1B), then the inverse transform values $I_{00}$–$I_{77}$ are the decoded luminance values for the pixels in the 8×8 block A (FIG. 1). But because of the information losses that quantization and dequantization cause, the inverse transform values I are often different than the respective pre-compression pixel values they represent. Fortunately, these losses are typically too small to cause visible degradation to a decoded video frame.

Still referring to FIG. 5, the decoded pixel values from the inverse DCT 68 pass through a summer 72—used during the decoding of motion-predicted macro blocks of non-I frames as discussed below—into a frame-reorder buffer 74, which stores the decoded frames and arranges them in a proper order for display on a video display unit 76. If a decoded frame is also used as a reference frame for purposes of motion decoding, then the decoded frame is also stored in the reference-frame buffer 78.

The decoder 62 uses the motion interpolator 80, the prediction encoder 66, and the reference-frame buffer 78 to decode motion-encoded macro blocks of non-I frames.

Referring to FIGS. 2 and 5, although described as including multiple functional circuit blocks, one may implement the encoder 30 and the decoder 62 in hardware, software, or a combination of both. For example, designers often implement the encoder 30 and decoder 62 with respective processors that perform the respective functions of the above-described circuit blocks.

More detailed discussions of the MPEG encoder 30 and the MPEG decoder 62 of FIGS. 2 and 5, respectively, of motion encoding and decoding, and of the MPEG standard in general are presented in many publications including "Video Compression" by Peter D. Symes, McGraw-Hill, 1998, which is incorporated by reference. Furthermore, other well-known block-based compression techniques are available for encoding and decoding video frames and still images.

The 2-D DCT F(v, u) is given by the following equation:

$$F(v, u) = \frac{2}{N} C(v)C(u) \sum_{y=0}^{N-1} \sum_{x=0}^{N-1} f(y, x) \cos\left(\frac{(2y+1)v\Pi}{2N}\right) \cos\left(\frac{(2x+1)u\Pi}{2N}\right) \quad 1)$$

$$C(v) = \frac{1}{\sqrt{2}} \text{ for } v = 0, C(v) = 1 \text{ otherwise}$$

$$C(u) = \frac{1}{\sqrt{2}} \text{ for } u = 0, C(u) = 1 \text{ otherwise}$$

where v is the row and u is the column of the corresponding transform block, and N is the dimension of v and u (N = 8 for an 8×8 block). For example, if F(v, u) represents the block 37 (FIG. 3) of transform values, then $F(1, 3) = D_{13}$. Likewise, f(y, x) is the pixel value in row y, column x of the corresponding pre-compression block. For example, if f(y, x) represents the block 22a (FIG. 1B) of pre-compression luminance values, then $f(0, 0) = Y_{(0, 0)4}$. Thus, each transform value F(v, u) depends on all of the pixel values f(y, x) in the corresponding pre-compression block.

The 2-D matrix form of F(v, u) is given by the following equation:

$$F(v, u) = f \cdot R_{vu} \quad 2)$$

where f is a 2-D matrix that includes the pixel values f(y, x), and $R_{vu}$ is a 2-D matrix that one can calculate from equation (1) and that is unique for each respective pair of coordinates v and u.

The IDCT f(y, x), which is merely the inverse of the DCT F(v, u) is given by the following equation:

$$f(y, x) = \frac{2}{N} \sum_{v=0}^{N-1} \sum_{u=0}^{N-1} C(v)C(u)F(v, u) \cos\left(\frac{(2y+1)v\Pi}{2N}\right) \cos\left(\frac{(2x+1)u\Pi}{2N}\right) \quad 3)$$

$$C(u) = \frac{1}{\sqrt{2}} \text{ for } u = 0, C(u) = 1 \text{ otherwise}$$

$$C(v) = \frac{1}{\sqrt{2}} \text{ for } v = 0, C(v) = 1 \text{ otherwise}$$

where y is the row and x is the column of the inverse-transform block. For example, if f(y, x) represents the block 70 (FIG. 6) of inverse transform values, then $f(7, 4) = I_{74}$.

The 2-D matrix form of f(y, x) is given by the following equation:

$$f(y, x) = F \cdot R_{yx} \quad 4)$$

where F is a 2-D matrix that includes the transform values F(v, u), and $R_{yx}$ is a 2-D matrix that one can calculate from equation (3) and that is unique for each respective pair of coordinates y and x.

To simplify the 2-D IDCT of equations (3) and (4), one can represent each respective row y of f(y, x) as a 1-D transform, and calculate f(y, x) as a series of 1-D IDCT's. The 1-D IDCT is given by the following equation:

$$\left(\left(fy(x) = \sqrt{\frac{2}{N}} \sum_{u=0}^{N-1} C(u)Fv(u) \cos\left(\frac{(2x+1)u\Pi}{2N}\right)\right)\right)\Big|_{x0,\ldots,7}^{y=v=row\#} \quad 5)$$

For example purposes, using the 1-D IDCT equation (5) to calculate the inverse-transform values $I_{00}$–$I_{77}$ of the block 70 (FIG. 6) from the transform values $D_{00}$–$D_{77}$ of the block 37 (FIG. 3) is discussed. The 8×8 matrices F and f that respectively represent the 8×8 blocks 37 and 70 in mathematical form are given by the following equations:

$$F = \begin{matrix} F0(u) \\ F(v, u) = F1(u) \\ \vdots \\ F7(u) \end{matrix} \begin{bmatrix} D_{07} & D_{06} & D_{05} & D_{04} & D_{03} & D_{02} & D_{01} & D_{00} \\ D_{17} & D_{16} & D_{15} & D_{14} & D_{13} & D_{12} & D_{11} & D_{10} \\ \vdots & \vdots & \vdots & \vdots & \vdots & \vdots & \vdots & \vdots \\ D_{77} & D_{76} & D_{75} & D_{74} & D_{73} & D_{72} & D_{71} & D_{70} \end{bmatrix} \quad 6)$$

$$f = \begin{matrix} f0(x) \\ f(y, x) = f1(x) \\ \vdots \\ f7(x) \end{matrix} \begin{bmatrix} I_{07} & I_{06} & I_{05} & I_{04} & I_{03} & I_{02} & I_{01} & I_{00} \\ I_{17} & I_{16} & I_{15} & I_{14} & I_{13} & I_{12} & I_{11} & I_{10} \\ \vdots & \vdots & \vdots & \vdots & \vdots & \vdots & \vdots & \vdots \\ I_{77} & I_{76} & I_{75} & I_{74} & I_{73} & I_{72} & I_{71} & I_{70} \end{bmatrix} \quad 7)$$

F0(u)–F7(u) are the rows of the matrix F and thus represent the respective rows of the block 37, and f0(x)–f7(x) are the rows of the matrix f and thus represent the respective rows of the block 70.

First, one calculates an intermediate 8×8 block of intermediate inverse-transform values I', which are represented by the 1-D transform fv(x), according to the following equation, which is equation (5) in matrix form:

$$f'0(x) = R_{yv} \cdot F0(u) \quad (8)$$

$$= \begin{bmatrix} R_{07} & R_{06} & R_{05} & R_{04} & R_{03} & R_{02} & R_{01} & R_{00} \\ R_{17} & R_{16} & R_{15} & R_{14} & R_{13} & R_{12} & R_{11} & R_{10} \\ \vdots & \vdots & \vdots & \vdots & \vdots & \vdots & \vdots & \vdots \\ R_{77} & R_{76} & R_{75} & R_{74} & R_{73} & R_{72} & R_{71} & R_{70} \end{bmatrix} \begin{bmatrix} D_{00} \\ D_{01} \\ D_{02} \\ D_{03} \\ D_{04} \\ D_{05} \\ D_{06} \\ D_{07} \end{bmatrix}$$

$$f'1(x) = R_{yv} \cdot F1(u)$$
$$\vdots$$
$$f'7(x) = R_{yv} \cdot F7(u)$$

$R_{yv}$ is a 2-D matrix that one can calculate from equation (5) and that is unique for each respective pair of coordinates y and v. Thus, the intermediate matrix f' is given by the following equation:

$$f' = f'v(x) = \begin{bmatrix} I'_{07} & \cdots & I'_{01} & I'_{00} \\ I'_{17} & \cdots & I'_{11} & I'_{10} \\ I'_{27} & \cdots & I'_{21} & I'_{20} \\ I'_{37} & \cdots & I'_{31} & I'_{30} \\ I'_{47} & \cdots & I'_{41} & I'_{40} \\ I'_{57} & \cdots & I'_{51} & I'_{50} \\ I'_{67} & \cdots & I'_{61} & I'_{60} \\ I'_{77} & \cdots & I'_{71} & I'_{70} \end{bmatrix} \quad (9)$$

To calculate the final matrix f of the inverse-transform values $I_{00}$–$I_{77}$ of the block 70 (FIG. 6), one transposes the intermediate matrix f' to obtain $f'^T$, replaces the transform rows F0(u)–F7(u) in equation (8) with the rows $f'^T0(x)$–$f'^T7$ (x) of $f'^T$, and then recalculates equation (8). $f'^T$ is given by the following equation:

$$f'^T = f'^Tv(x) = \begin{bmatrix} I'_{70} & \cdots & I'_{10} & I'_{00} \\ I'_{71} & \cdots & I'_{11} & I'_{01} \\ I'_{72} & \cdots & I'_{12} & I'_{02} \\ I'_{73} & \cdots & I'_{13} & I'_{03} \\ I'_{74} & \cdots & I'_{14} & I'_{04} \\ I'_{75} & \cdots & I'_{15} & I'_{05} \\ I'_{76} & \cdots & I'_{16} & I'_{06} \\ I'_{77} & \cdots & I'_{17} & I'_{07} \end{bmatrix} \quad (10)$$

The subscript coordinates of the inverse-transform values I' in equation (10) are the same as those in equation (9) to clearly show the transpose. That is, $I'_{10}$ of equation (10) equal $I'_{10}$ of equation (9). Thus, to transpose a matrix, one merely interchanges the rows and respective columns within the matrix. For example, the first row of f' becomes the first column of $f'^T$, the second row of f' becomes the second column of $f'^T$, and so on. The following equation shows the calculation of the inverse-transform matrix f:

$$f0(x) = \quad (11)$$

$$R_{yv} \cdot f'^T 0(x) \begin{bmatrix} R_{07} & R_{06} & R_{05} & R_{04} & R_{03} & R_{02} & R_{01} & R_{00} \\ R_{17} & R_{16} & R_{15} & R_{14} & R_{13} & R_{12} & R_{11} & R_{10} \\ \vdots & \vdots & \vdots & \vdots & \vdots & \vdots & \vdots & \vdots \\ R_{77} & R_{76} & R_{75} & R_{74} & R_{73} & R_{72} & R_{71} & R_{70} \end{bmatrix} \cdot \begin{bmatrix} I'_{00} \\ I'_{10} \\ I'_{20} \\ I'_{30} \\ I'_{40} \\ I'_{50} \\ I'_{60} \\ I'_{70} \end{bmatrix}$$

$$f1(x) = R_{yv} \cdot f'^T 1(x)$$
$$\vdots$$
$$f7(x) = R_{yv} \cdot f'^T 7(x)$$

Thus, equation (11) gives the inverse-transform values $I_{00}$–$I_{77}$ of the block 70 (FIG. 6).

Referring to equations (8)–(11), although splitting the 2-D IDCT into a series of two 1-D IDCTs simplifies the mathematics, these equations still involve a large number of 8-point-vector-by-8-point-vector multiplications for converting the 8×8 block 37 (FIG. 3) of transform values into the 8×8 block 70 (FIG. 7) of inverse-transform values. For example, an 8-value matrix row times an 8-value matrix column (e.g., equation (11)), is an 8-point-vector multiplication. Unfortunately, processors typically require a relatively complex architecture to handle vector multiplications of this size.

Masaki's IDCT Technique

As discussed in his paper, Masaki further simplifies the 1-D IDCT equations (8)–(11) by breaking the 8-point-vector multiplications down into 4-point-vector multiplications. This allows processors with relatively simple architectures to convert the block 37 (FIG. 3) of transform values into the block 70 (FIG. 6) of inverse-transform values.

The following equation gives the first row of even and odd Masaki values de and do from which one can calculate the first row of intermediate inverse-transform values $I'_{00}$–$I'_{07}$ from the matrix of equation (9):

$$QD_e = \begin{bmatrix} de_{00} \\ de_{01} \\ de_{02} \\ de_{03} \end{bmatrix} = \begin{bmatrix} Me_3 & Me_2 & Me_1 & Me_0 \\ Me_7 & Me_6 & Me_5 & Me_4 \\ Me_b & Me_a & Me_9 & Me_8 \\ Me_f & Me_e & Me_d & Me_c \end{bmatrix} \cdot \begin{bmatrix} D_{00} \\ D_{01} \\ D_{04} \\ D_{06} \end{bmatrix} \quad (12)$$

$$PD_o = \begin{bmatrix} do_{00} \\ do_{01} \\ do_{02} \\ do_{03} \end{bmatrix} = \begin{bmatrix} Mo_3 & Mo_2 & Mo_1 & Mo_0 \\ Mo_7 & Mo_6 & Mo_5 & Mo_4 \\ Mo_b & Mo_a & Mo_9 & Mo_8 \\ Me_f & Me_e & Me_d & Me_c \end{bmatrix} \cdot \begin{bmatrix} D_{01} \\ D_{03} \\ D_{05} \\ D_{07} \end{bmatrix}$$

$D_{00}$–$D_{07}$ are the values in the first row of the transform block 37, $M_{e0}$-$M_{ef}$ are the even Masaki coefficients, and $M_{o0}$-$M_{of}$ are the odd Masaki coefficients. The values of the even and odd Masaki coefficients are given in Masaki's paper, which is heretofore incorporated by reference. One calculates the remaining rows of Masaki values—seven, one for each remaining row of transform values in the block 37—in a similar manner.

One calculates the intermediate inverse-transform values $I'_{00}$–$I'_{07}$ from the even and odd Masaki values de and do of equation (12) according to the following equation:

$$\begin{bmatrix} I'_{00} \\ I'_{01} \\ I'_{02} \\ I'_{03} \end{bmatrix} = \frac{1}{2}PD_0 + \frac{1}{2}QD_e = \frac{(PD_0 + QD_e)}{2} \quad (13)$$

$$\begin{bmatrix} I'_{07} \\ I'_{06} \\ I'_{05} \\ I'_{04} \end{bmatrix} = \frac{1}{2}PD_0 - \frac{1}{2}QD_e = \frac{(PD_0 - QD_e)}{2}$$

One calculates the remaining rows of intermediate inverse-transform values I' in a similar manner.

FIG. 7 is a block 82 of the values I' generated by the group of Masaki equations represented by the equation (13). Accordingly, the last four values in each Referring to FIG. 8, one generates a properly ordered block 84 of the values I' by putting $I'_{y4}$–$I'_{y7}$ in the proper order. Unfortunately, this reordering takes significant processing time.

Next, referring to FIG. 9, in a manner similar to that described above in conjunction with equations (9) and (10), one calculates the final inverse-transform values $I_{yx}$ by transposing the block 84 (FIG. 8) to generate a transposed block 86 and by replacing the row of transform values $D_{00}$–$D_{07}$ in equation (12) with the respective rows of the transposed block 86.

But referring to FIG. 10, equation (12) requires one to separate the row of transform values D into an even group $D_{00}$, $D_{02}$, $D_{04}$, and $D_{06}$ and an odd group $D_{01}$, $D_{03}$, $D_{05}$, and $D_{07}$. Therefore, one must also separate the rows of intermediate inverse-transform values I' into respective even groups $I'_{y0}$, $I'_{y2}$, $I'_{y4}$, and $I'_{y6}$ and odd groups $I'_{y1}$, $I'_{y3}$, $I'_{y5}$, and $I'_{y7}$. Thus, one performs this even-odd separation on the block 86 (FIG. 9) to generate an even-odd separated block 88 of the intermediate values I'. Replacing the row of transform values $D_{00}$–$D_{07}$ in equation (12) with the respective rows of the block 88, one generates intermediate Masaki vectors $P'D_o$ and $Q'D_e$ and generates the final inverse-transform values I according to the following equation:

$$\begin{bmatrix} I_{00} \\ I_{01} \\ I_{02} \\ I_{03} \end{bmatrix} = \frac{1}{2}P'D_0 + \frac{1}{2}Q'D_e = \frac{(P'D_0 + Q'D_e)}{2} \quad (14)$$

$$\begin{bmatrix} I_{07} \\ I_{06} \\ I_{05} \\ I_{04} \end{bmatrix} = \frac{1}{2}P'D_0 - \frac{1}{2}Q'D_e = \frac{(P'D_0 - Q'D_e)}{2}$$

Referring to FIG. 11, using equation (14) for each set of intermediate Masaki vectors generates a block 90 in which the last four inverse-transform values $I_{y4}$–$I_{y7}$ in each row are in inverse order. Therefore, one generates the properly ordered block 70 (FIG. 3) by putting $I_{y4}$–$I_{y7}$ in the proper order. Unfortunately, this reordering takes significant processing time.

Therefore, although Masaki's technique may simplify the processor architecture by breaking down 8-point-vector multiplications into 4-point-vector multiplications, it typically requires more processing time than the 8-point technique due to Masaki's time-consuming block transpositions and rearrangements.

SUMMARY OF THE INVENTION

In one aspect of the invention, an image decoder includes a memory and a processor coupled to the memory. The processor is operable to store a column of intermediate values in the memory as a row of intermediate values, combine the intermediate values within the stored row to generate a column of resulting values, and store the resulting values in the memory as a row of resulting values.

Such an image decoder can store the Masaki values in a memory register such that when the processor combines these values to generate the intermediate inverse-transform values, it stores these values in a transposed fashion. Thus, such an image decoder reduces the image-processing time by combining the generating and transposing of the values I' into a single step.

In a related aspect of the invention, the intermediate values include a first even-position even intermediate value, an odd-position-even intermediate value, a second even-position even intermediate value, a first even-position odd intermediate value, an odd-position odd intermediate value, and a second even-position odd intermediate value. The processor stores the first even-position even intermediate value and the first even-position odd intermediate value in a first pair of adjacent storage locations. The processor also stores the second even-position even intermediate value and the second even-position odd intermediate value in a second pair adjacent storage locations, the second pair of storage locations being adjacent to the first pair of storage locations.

Such an image decoder can store the Masaki values in a memory register such that when the processor combines these values to generate the intermediate inverse-transform values, it stores these values in a transposed and even-odd-separated fashion. Thus, such an-image decoder reduces the image-processing time by combining the generating, transposing, and even-odd separating of the values I' into a single step.

BRIEF DESCRIPTION OF THE DRAWINGS

FIG. 3 is a block of transform values that the encoder of FIG. 2 generates.

FIG. 6 is a block of inverse transform values that the decoder of FIG. 5 generates.

FIG. 9 is a block having the intermediate inverse-transform values of FIG. 8 in a transposed arrangement.

FIG. 10 is a block having the intermediate inverse-transform values of FIG. 9 in an even-odd-separated arrangement.

DETAILED DESCRIPTION OF THE INVENTION

Figures 1A, 1B, 1C, 1D:
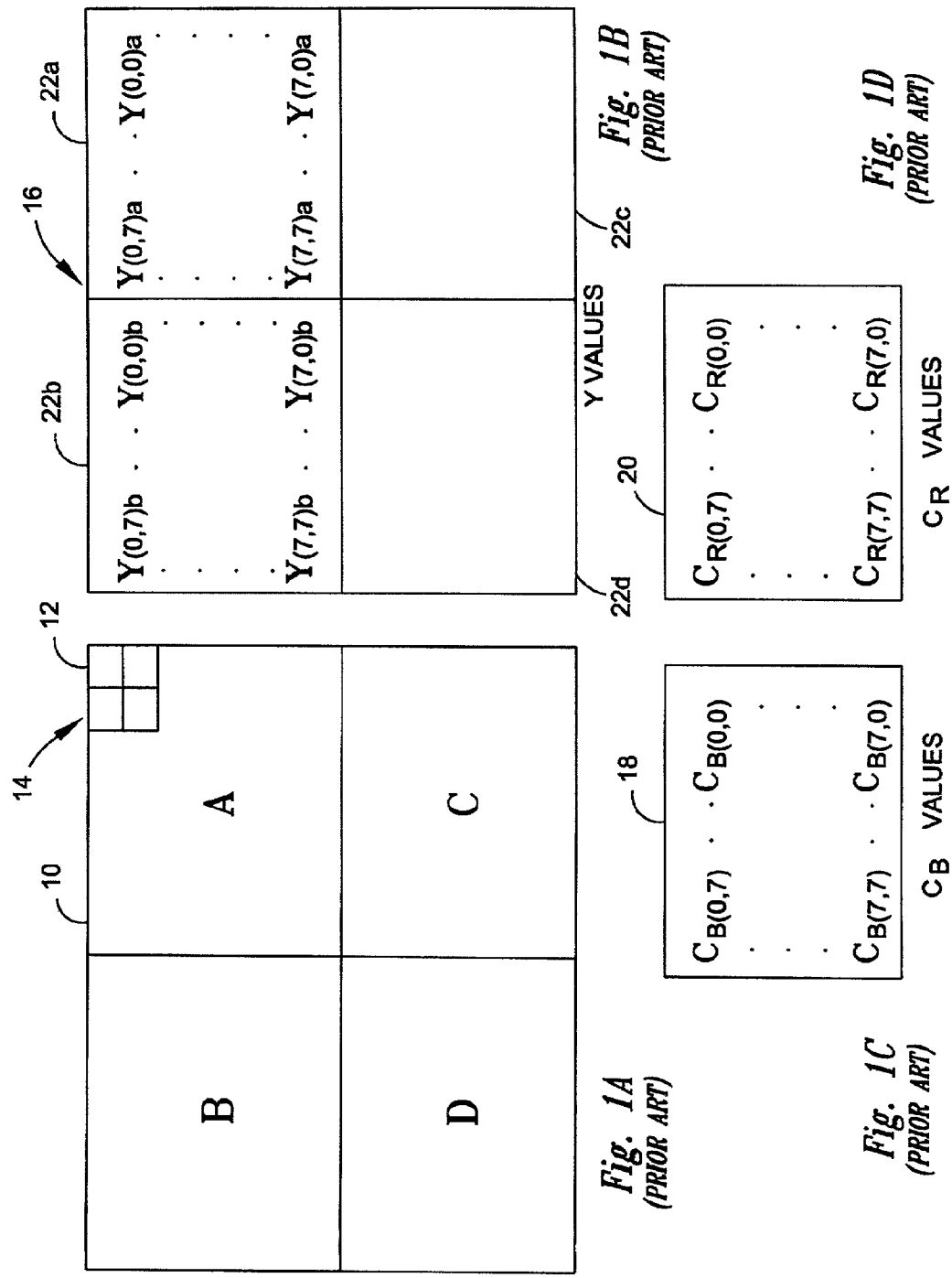
FIG. 1A is a diagram of a conventional macro block of pixels in an image.
FIG. 1B is a diagram of a conventional block of pre-compression luminance values that respectively correspond to the pixels in the macro block of FIG. 1A.
FIGS. 1C and 1D are respective diagrams of conventional blocks of pre-compression chroma values that respectively correspond to the pixel groups in the macro block of FIG. 1A.
Figure 2:
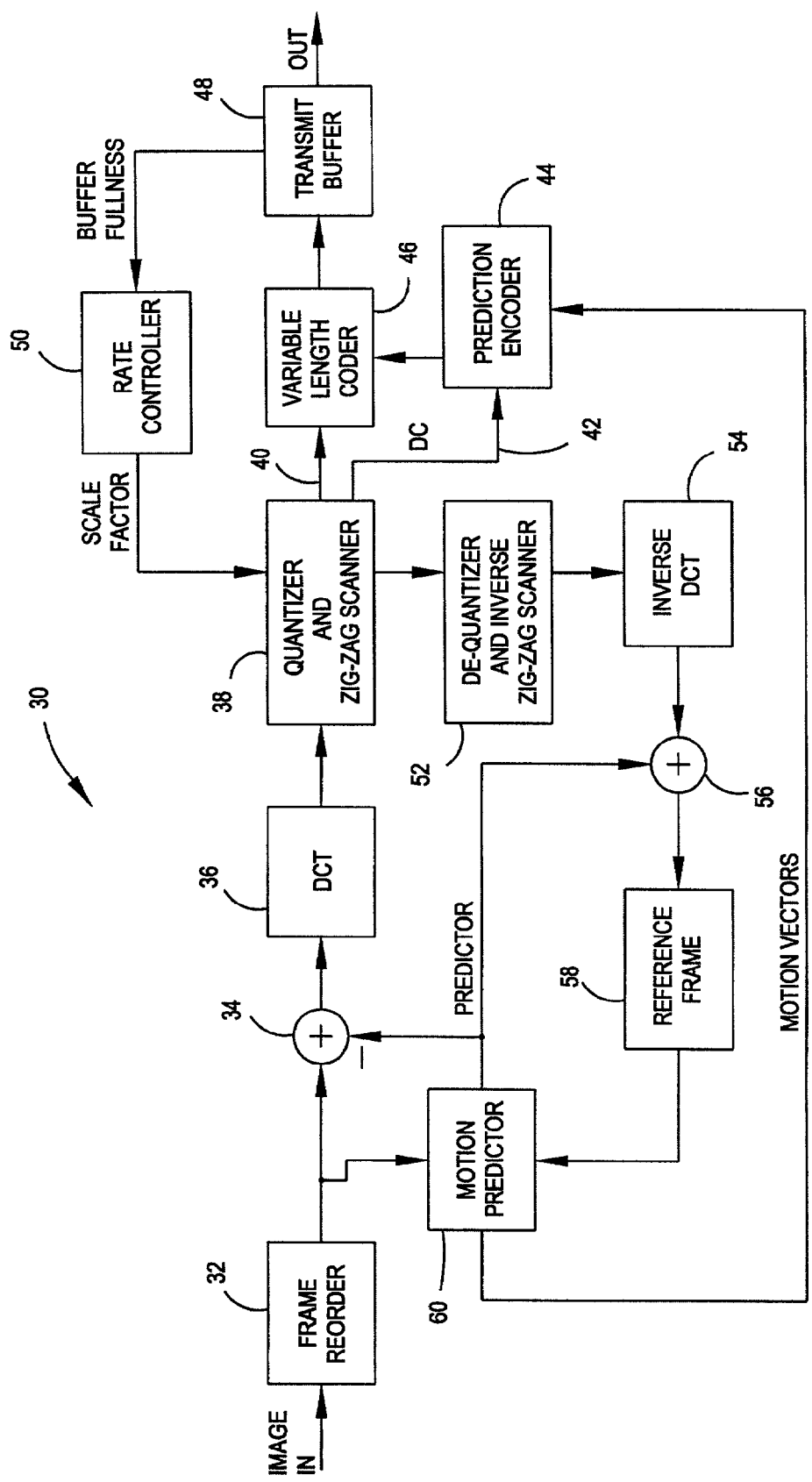
FIG. 2 is a block diagram of a conventional MPEG encoder.
Figure 4:
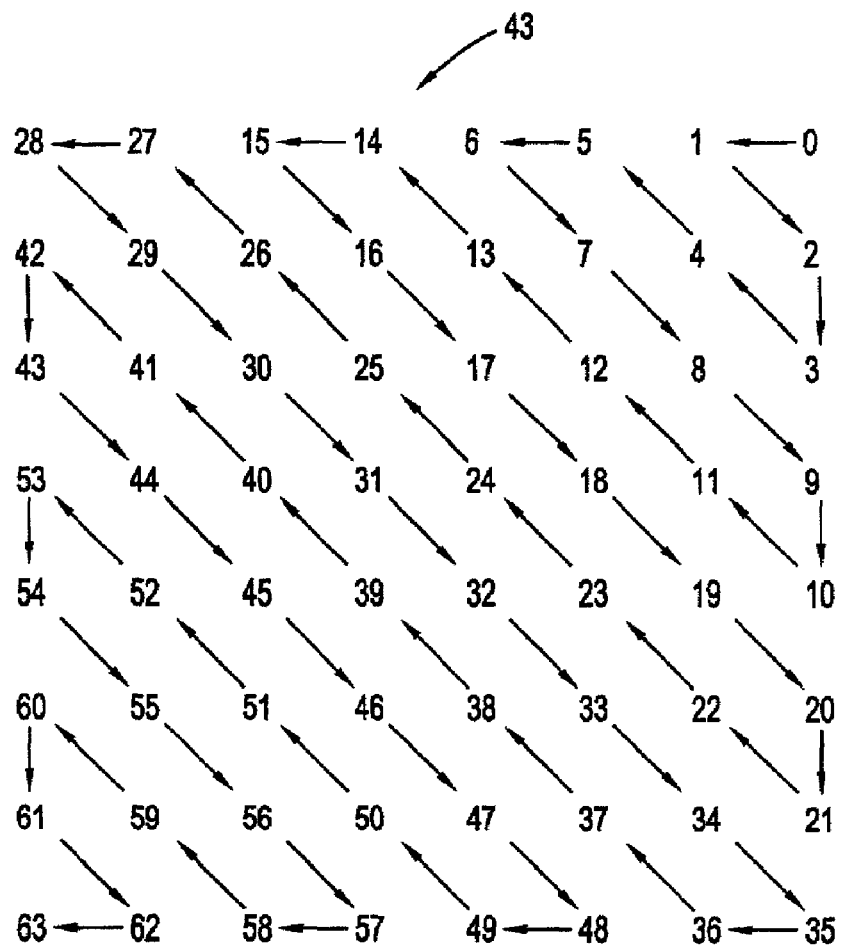
FIG. 4 is a conventional zigzag scan pattern that the quantizer and zigzag scanner of FIG. 2 implements.
Figure 5:
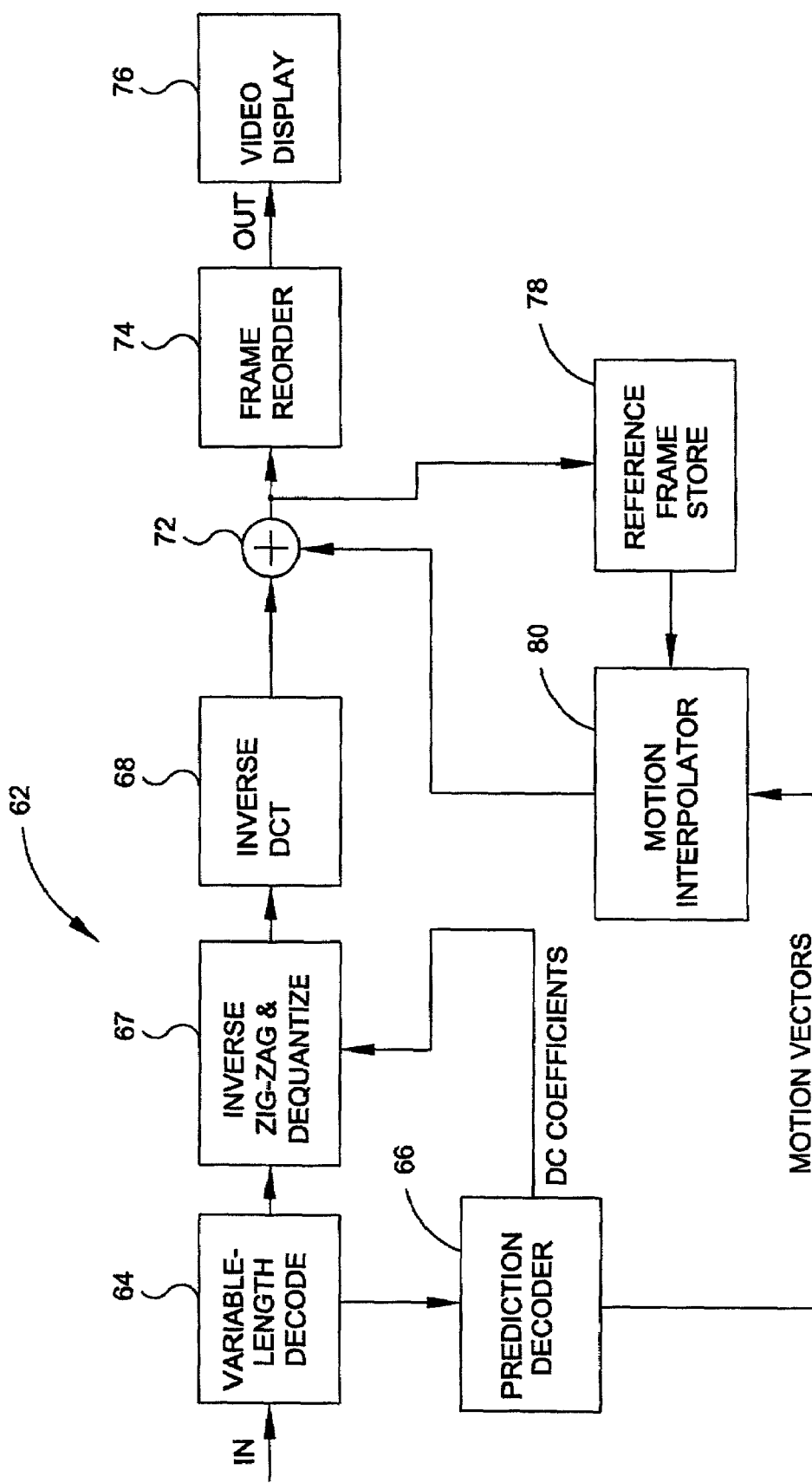
FIG. 5 is a block diagram of a conventional MPEG decoder.
Figure 7:
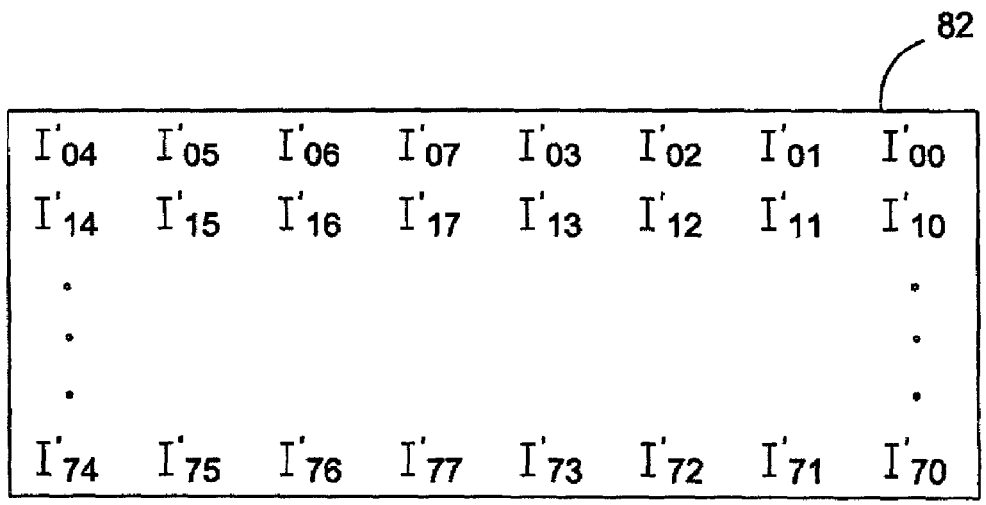
FIG. 7 is a block of intermediate inverse-transform values according to Masaki's technique.
Figure 8:
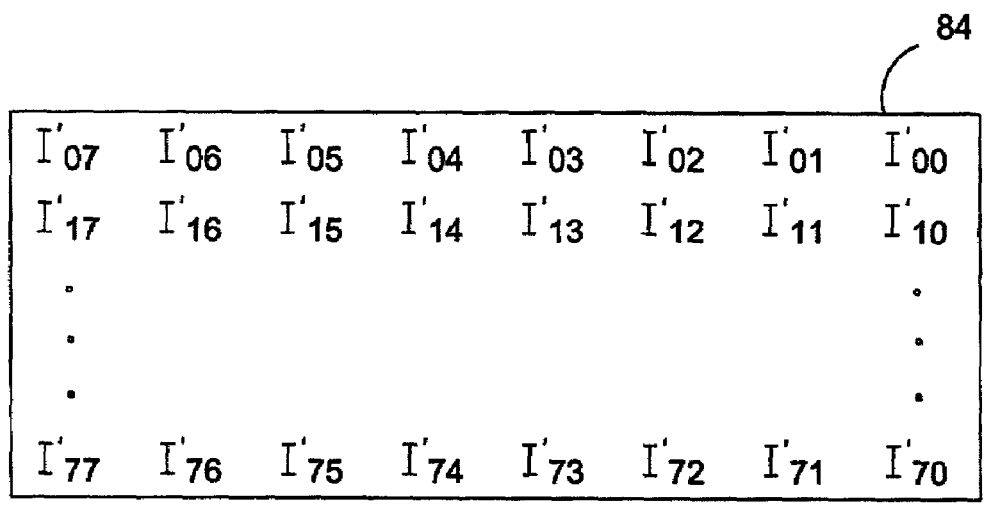
FIG. 8 is a block having the intermediate inverse-transform values of FIG. 7 in sequentially ordered rows.
Figure 12:
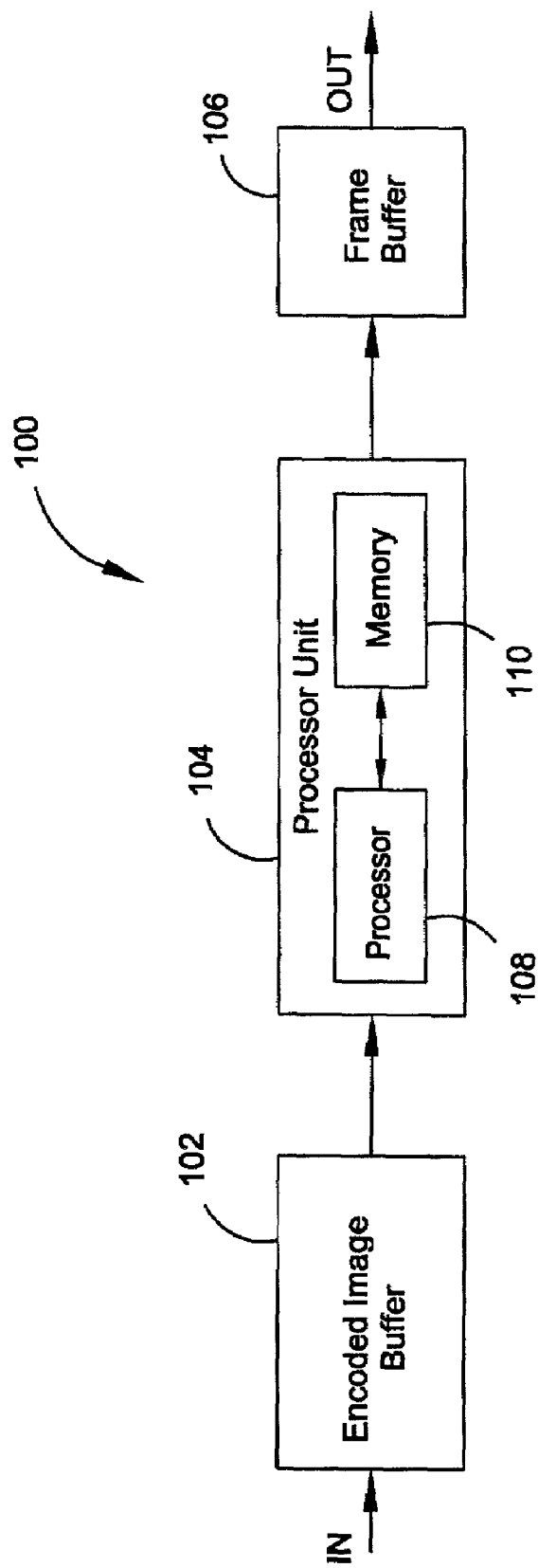
FIG. 12 is a block diagram of an image decoder according to an embodiment of the invention.

FIG. 12 is a block diagram of an image decoder 100 according to an embodiment of the invention. The decoder 100 significantly decreases Masaki's IDCT time by calculating and transposing the intermediate inverse-transform values I' in the same step as discussed below in conjunction with FIG. 17. That is, the decoder 100 generates the block 86 (FIG. 9) of transposed values I' directly from equation (13), and thus omits the generation of the blocks 82 (FIG. 7) and 84 (FIG. 8). The decoder 100 may further decrease Masaki's IDCT conversion time by calculating, transposing, and even-odd separating the intermediate inverse-transform values I' in the same step as discussed below in conjunction with FIG. 18. That is, the decoder 100 generates the block 88 (FIG. 10) of transposed values I' directly from equation (13), and thus omits the generation of the blocks 82, 84, and 86.

The decoder 100 includes an input buffer 102, a processor unit 104, and an optional frame buffer 106. The input buffer 102 receives and stores encoded data that represents one or more encoded images. The processor unit 104 includes a processor 108 for decoding the encoded image data and includes a memory 110. If the received encoded image data represents video frames, then the decoder 100 includes the optional frame buffer 106 for storing the decoded frames from the processing unit 104 in the proper order for storage or display.

Figure 13:
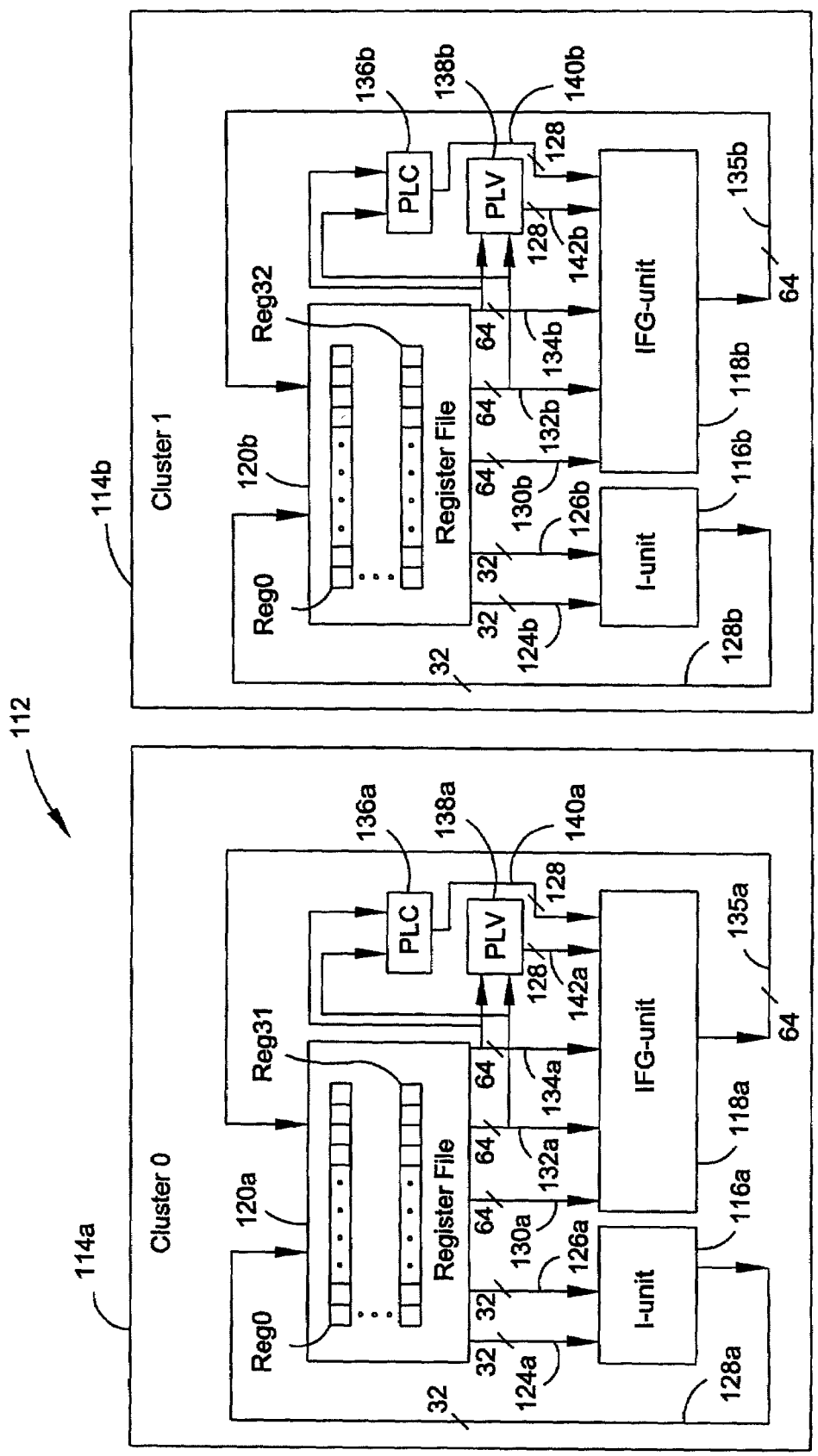
FIG. 13 is a block diagram of the processor of FIG. 12 according to an embodiment of the invention.

FIG. 13 is a block diagram of a computing unit 112 of the processor 108 (FIG. 12) according to an embodiment of the invention. The unit 112 includes two similar computing clusters 114a and 114b, which typically operate in parallel. For clarity, only the structure and operation of the cluster 114a is discussed, it being understood that the structure and operation of the cluster 114b are similar. Furthermore, the clusters 114a and 114b may include additional circuitry that is omitted from FIG. 13 for clarity.

In one embodiment, the cluster 114a includes an integer computing unit (I-unit) 116a and an integer, floating-point, graphics computing unit (IFG-unit) 118a. The I-unit 116a performs memory-load and memory-store operations and simple arithmetic operations on 32-bit integer data. The IFG-unit 118a operates on 64-bit data and can perform complex mathematical operations that are tailored for multimedia and 3-D graphics applications. The cluster 114a also includes a register file 120a, which includes thirty two 64-bit registers Reg0–Reg32. The I-unit 116a and IFG-unit 118a can access each of these registers as respective upper and lower 32-bit partitions, and the IFG-unit 118a can also access each of these registers as a single 64-bit partition. The I-unit 116a receives data from the register file 120a via 32-bit busses 124a and 126a and provides data to the register file 120a via a 32-bit bus 128a. Likewise, the IFG-unit 118a receives data from the register file 120a via 64-bit busses 130a, 132a, and 134a and provides data to the register file 120a via a 64-bit bus 136a.

Still referring to FIG. 13, in another embodiment, the cluster 114a includes a 128-bit partitioned-long-constant (PLC) register 136a and a 128-bit partitioned-long-variable (PLV) register 138a. The PLC and PLV registers 136a and 138a improve the computational throughput of the cluster 114a without significantly increasing its size. The registers 136a and 138a receive data from the register file 120a via the busses 132a and 134a and provide data to the IFG-unit 118a via 128-bit busses 140a and 142a, respectively. Typically, IFG-unit 118a operates on the data stored in the registers 136a and 138a during its execution of special multimedia instructions that cause the IFG-unit 118a to produce a 32- or 64-bit result and store the result in one of the registers Reg0–Reg31. In addition, these special instructions may cause the register file 132a to modify the content of the register 138a.

In one embodiment, there is no direct path between the memory 108 (FIG. 12) and the PLC and PLV registers 136a and 138a. Therefore, the cluster 114a initializes these registers from the register file 120a before the IFG-unit 118a operates on their contents. Although the additional clock cycles needed to initialize these registers may seem inefficient, many multimedia applications minimize this overhead by using the data stored in the registers 136a and 138a for several different operations before reloading these registers. Furthermore, some instructions cause the cluster 114a to update the PLV register 138a while executing another operation, thus eliminating the need for additional clock cycles to load or reload the register 138a.

Figure 14A:
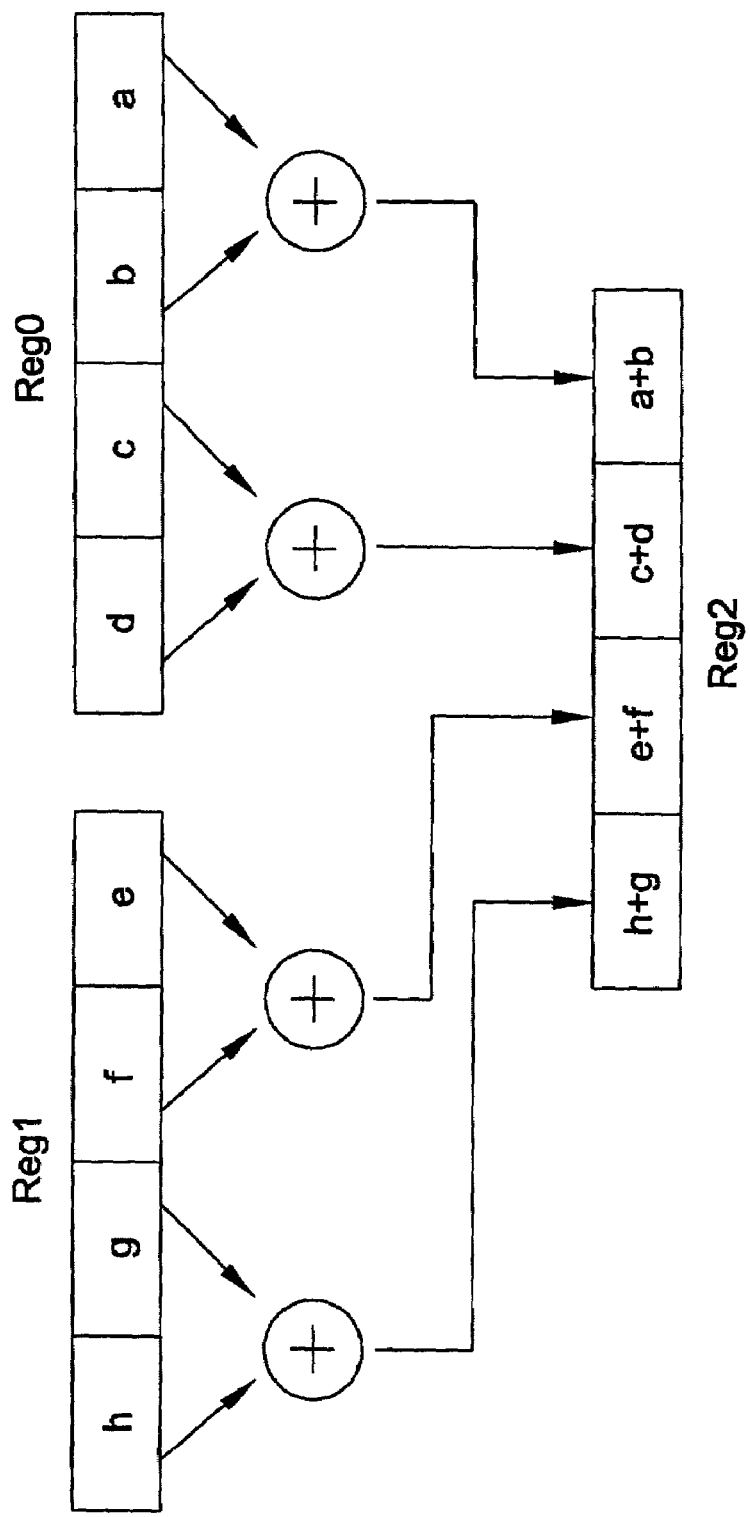
FIG. 14A illustrates a pair-wise add operation that the processor of FIG. 13 executes according to an embodiment of the invention.

FIG. 14A illustrates a pair-wise add operation that the cluster 114a of FIG. 13 can execute according to an embodiment of the invention. For example purposes, Reg0 of the register file 120a (FIG. 13) stores four 16-bit values a–d, and Reg1 stores four 16-bit values e–h. The IFG-unit 118a adds the contents of the adjacent partitions of Reg0 and Reg1, respectively, and loads the resulting sums into respective 16-bit partitions of Reg2 in one clock cycle. Specifically, the unit 118a adds a and b and loads the result a +b into the first 16-bit partition of Reg2. Similarly, the unit 118a adds c and d, e and f, and g and h, and loads the resulting sums c+d, e+f, and g+h into the second, third, and fourth partitions, respectively, of Reg2. Furthermore, the unit 118a may divide each of the resulting sums a+b, c+d, e+f, and g+h by two before storing them in the respective partitions of Reg2.

The unit 118a right shifts each of the resulting sums by one bit to perform this division.

Figure 14B:
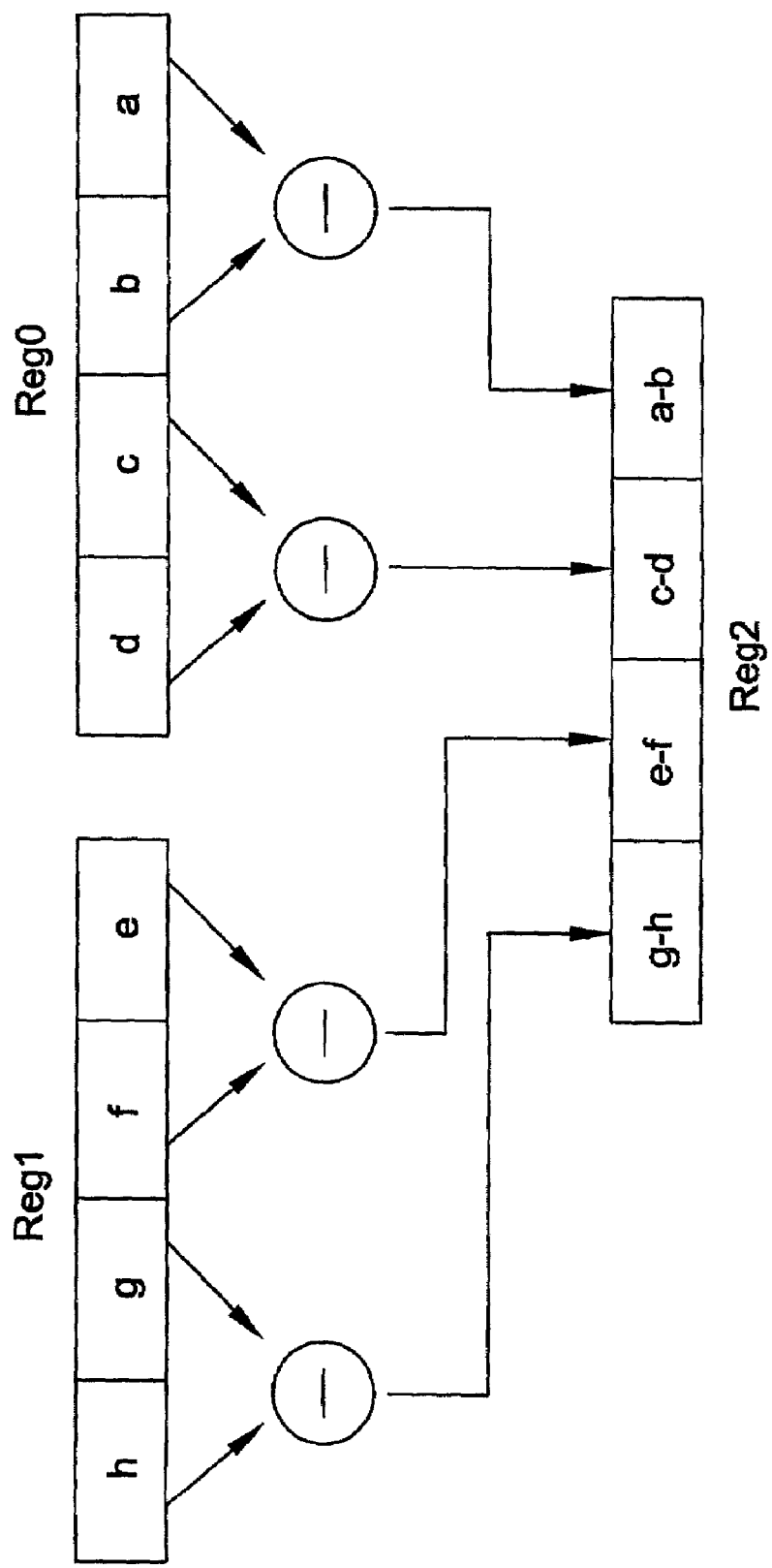
FIG. 14B illustrates a pair-wise subtract operation that the processor of FIG. 13 executes according to an embodiment of the invention.

FIG. 14B illustrates a pair-wise subtract operation that the cluster 114a of FIG. 13 can execute according to an embodiment of the invention. Reg0 stores the four 16-bit values a–d, and Reg1 stores the four 16-bit values e–h. The IFG-unit 118a subtracts the contents of the one partition from the contents of the adjacent partition and loads the resulting differences into the respective 16-bit partitions of Reg2 in one clock cycle. Specifically, the unit 118a subtracts b from a and loads the result a–b into the first 16-bit partition of Reg2. Similarly, the unit 118a subtracts d from c, f from e, and h from g, and loads the resulting differences a–b, c–d, e–f, and g–h into the first, second, third, and fourth partitions, respectively, of Reg2. Furthermore, the unit 118a may divide each of the resulting differences a–b, c–d, e–f, and g–h by two before storing them in the respective partitions of Reg2. The unit 118a right shifts each of the resulting differences by one bit to perform this division.

Referring to FIGS. 14A and 14B, although Reg0, Reg1, and Reg2 are shown divided into 16-bit partitions, in other embodiments the IFG-unit 118a performs the pair-wise add and subtract operations on partitions having other sizes. For example, Reg0, Reg1, and Reg2 may be divided into eight 8-bit partitions, two 32-bit partitions, or sixteen 4-bit partitions. In addition, the IFG-unit 118a may execute the pair-wise add and subtract operations using registers other than Reg0, Reg1, and Reg2.

As discussed below in conjunction with FIGS. 16–18, the pair-wise add and subtract and divide-by-two features allows the IFG-unit 118a to calculate the intermediate and final inverse-transform values I' and I from the Masaki values as shown in equations (13) and (14).

Figure 15:
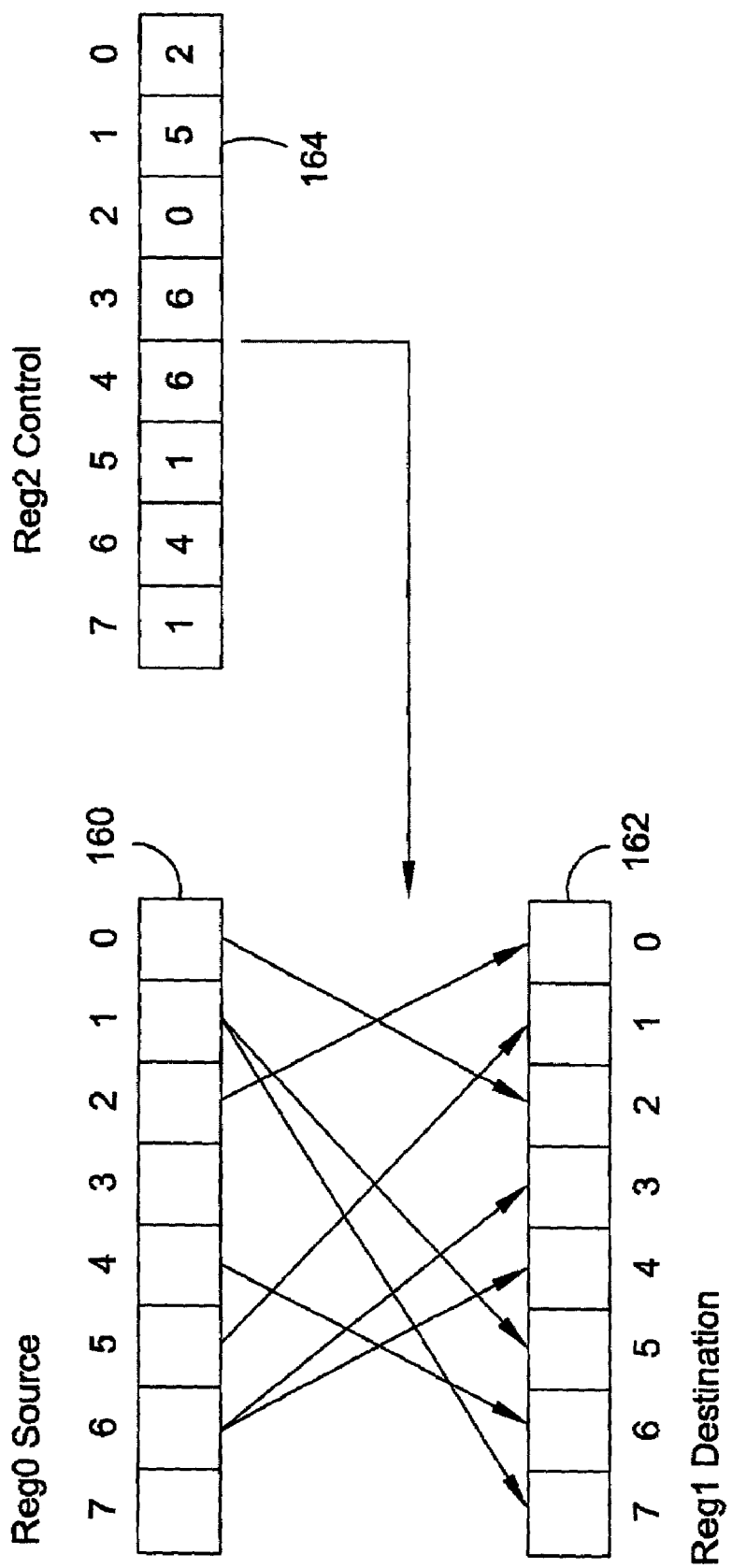
FIG. 15 illustrates a register map function that the processor of FIG. 13 executes according to an embodiment of the invention.

FIG. 15 illustrates a map operation that the cluster 114a of FIG. 13 can execute according to an embodiment of the invention. For example, a source register Reg0 is divided into eight 8-bit partitions 0–7 and contains the data that the cluster 114a is to map into a destination register Regi, which is also divided into eight 8-bit partitions 0–7. A 32-bit partition of a control register Reg2 (only one 32-bit partition shown for clarity) is divided into eight 4-bit partitions 0–7 and contains identification values that control the mapping of the data from the source register Reg0 to the destination register Reg1. Specifically, each partition of the control register Reg2 corresponds to a respective partition of the destination register Reg1 and includes a respective identification value that identifies the partition of the source register Reg0 from which the respective partition of the destination register Reg1 is to receive data. For example, the partition 0 of the control register Reg2 corresponds to the partition 0 of the destination register Regi and contains an identifier value "2". Therefore, the cluster 114a loads the contents of the partition 2 of the source register Reg0 into the partition 0 of the destination register Reg1 as indicated by the respective pointer between these two partitions. Likewise, the partition I of the control register Reg2 corresponds to the partition 1 of the destination register Reg1 and contains the identifier value "5". Therefore, the cluster 114a loads the contents of the partition 5 of the source register Reg0 into the partition 1 of the destination register Reg1. The cluster 114a can also load the contents of one of the source partitions into multiple destination partitions. For example, the partitions 3 and 4 of the control register Reg2 both include the identification value "6". Therefore, the cluster 114a loads the contents of the partition 6 of the source register Reg0 into the partitions 3 and 4 of the destination register Reg1. In addition, the cluster 114a may not load the contents of a source partition into any of the destination partitions. For example, none of the partitions of the control register Reg1 contains the identity value "7". Thus, the cluster 114a does not load the contents of the partition 7 of the source register Reg0 into a partition of the destination register Reg1.

Figure 11:
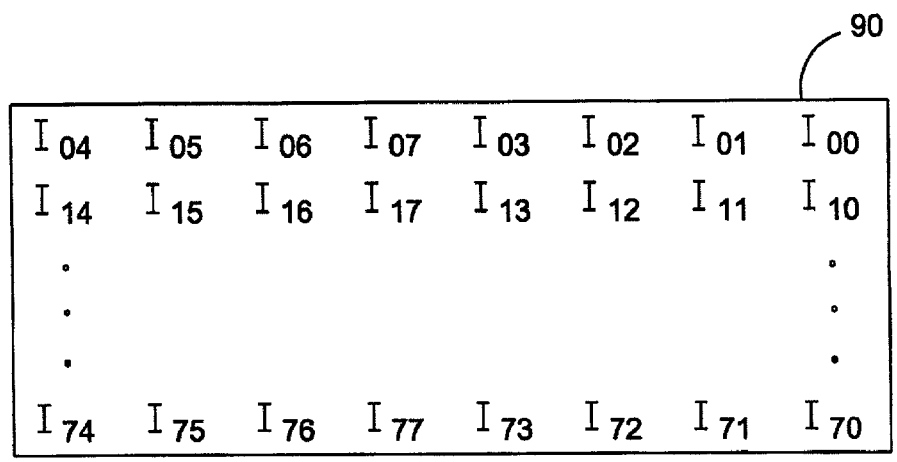
FIG. 11 is a block of final inverse-transform values according to Masaki's technique.

As discussed below in conjunction with FIGS. 17–18, the cluster 114a performs the map operation to reorder the inverse-transform values I in the block 90 (FIG. 11) to obtain the block 70 (FIG. 3).

Figure 16:
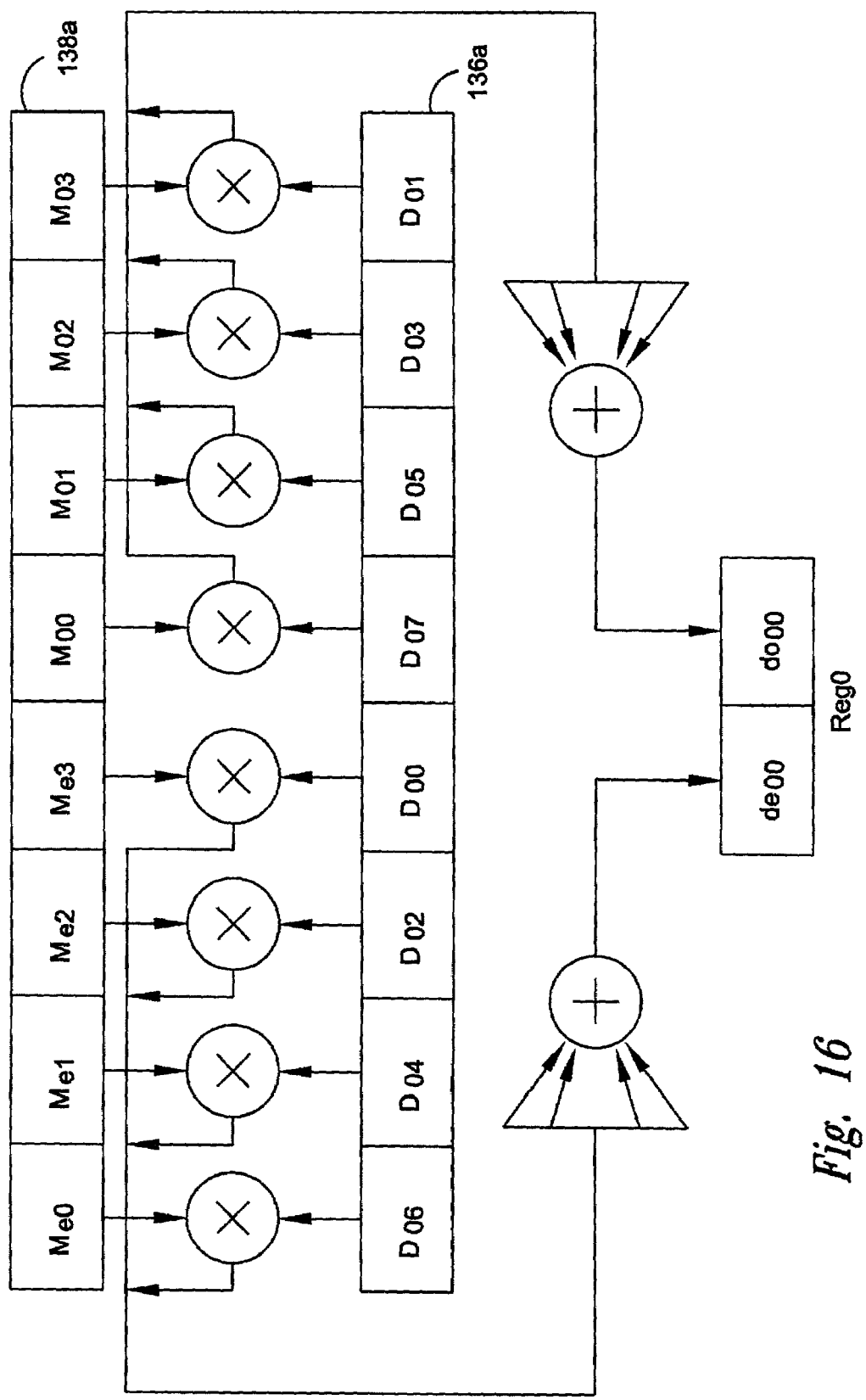
FIG. 16 illustrates a dual-4-point-vector-multiplication function that the processor of FIG. 13 executes according to an embodiment of the invention.

FIG. 16 illustrates a 4-point-vector-product operation that the cluster 114a (FIG. 13) can execute according to an embodiment of the invention. The cluster 114a loads two 4-point vectors from the register file 120a into the PLC register 136a and two 4-point vectors into the register PLV 138a, where each vector value is 16 bits. For example, during a first clock cycle, the cluster 114a loads the even-odd separated first row of transform values $D_{00}$, $D_{02}$, $D_{04}$, $D_{06}$, $D_{01}$, $D_{03}$, $D_{05}$, and $D_{07}$ in the block 37 (FIG. 3) into the PLC register 136a as shown. During a second clock cycle, the cluster I 14a loads the first row of Masaki's four 16-bit even constants (equation (12)) and the first row of Masaki's four 16-bit odd constants into the PLV register 138a as shown. During a third clock cycle, the IFG-unit 118a multiplies the contents of each corresponding pair of partitions of the registers 136a and 138a, adds the respective products, and loads the results into a 32-bit partition of Reg0 (only one 32-bit partition shown for clarity). That is, the unit 118a multiplies $D_{00}$ by $M_{e3}$, $D_{02}$ by $M_{e2}$, $D_{04}$ by $M_{e1}$, $D_{06}$ by $M_{e0}$, $D_{01}$ by $M_{o3}$, $D_{03}$ by $M_{o2}$, $D_{05}$ by $M_{o1}$, and $D_{07}$ by $M_{oO}$, sums the products $D_{00} \times M_{e3}$, $D_{02} \times M_{e2}$, $D_{04} \times M_{e1}$, and $D_{06} \times M_{e0}$ to generate the even Masaki value $de_{00}$, sums the products $D_{01} \times M_{o3}$, $D_{03} \times M_{o2}$, $D_{05} \times M_{o1}$, and $D_{07} \times M_{oO}$ to generate the odd Masaki value $do_{00}$, and loads $de_{00}$ and $do_{00}$ into respective halves of the 32-bit partition of Reg0. As discussed below in conjunction with FIGS. 17 and 18, the unit 118a can use the pair-wise add and subtract and the divided-by-two operations (FIGS. 14A–14B) on the Reg0 to generate the intermediate inverse-transform values $I'_{00}$ and $I'_{07}$ of equation (13).

Referring to FIGS. 13 and 16, because both clusters 114a and 114b can simultaneously perform four 4-point-vector-product operations, the computing unit 112 can calculate $QD_e$ and $PD_0$ (equation (13)) for two rows of the transform values D (block 37 of FIG. 3) in five clock cycles according to an embodiment of the invention. During the first clock cycle, the clusters 114a and 114b respectively load the first even-odd separated row of transform values D into the PLC register 136a and the second even-odd separated row of transform values into the PLC register 136b. (The processor 108 even-odd separates the transform values using the map operation or as discussed below.) During the second cycle, the clusters 114a and 114b load the first rows of the even and odd Masaki constants ($M_{e0}$–$M_{e3}$ and $M_{oO}$–$M_{o3}$) into the PLV registers 138a and 138b, respectively, and respectively calculate $de_{00}$ and $do_{00}$ and $de_{10}$ and $do_{10}$ as discussed above. During the third cycle, the clusters 114a and 114b load the second rows of the even and odd Masaki constants ($M_{e4}$–$M_{e7}$ and $M_{o4}$–$M_{o7}$) into the PLV registers 138a and 138b, respectively, and respectively calculate $de_{01}$ and $do_{01}$ and $de_{11}$ and $do_{11}$. During the fourth cycle, the clusters 114a and 114b load the third rows of the even and odd Masaki constants ($M_{e8}$–$M_{eb}$ and $M_{o8}$–$M_{ob}$) into the PLV registers 138a and 138b, respectively, and respectively calculate $de_{02}$ and $do_{02}$ and $de_{12}$ and $do_{12}$. And during the fifth cycle, the clusters 114a and 114b load the fourth rows of the even and odd Masaki constants ($M_{ec}$–$M_{ef}$ and $M_{oc}$–$M_{of}$) into the PLV registers 138a and 138b, respectively, and respectively calculate $de_{03}$ and $de_{03}$ and $de_{13}$ and $do_{13}$. Thus, the computing unit 112 can calculate $QDe$ and $PD_O$ significantly faster than prior processing circuits such as the one described by Masaki.

In one embodiment, to save processing time during the calculation of $QD_e$ and $PD_o$, the processor 108 (FIG. 12) even-odd separates the rows of the transform block 37 (FIG. 3) for conformance with equation (12) during the inverse zigzag scan of the image data. For example, the processor 108 stores the first transform row in even-odd separated order, i.e., $D_{00}$, $D_{02}$, $D_{04}$, $D_{06}$, $D_{01}$, $D_{03}$, $D_{05}$, and $D_{07}$, as it reads this row from the input buffer 102. Thus, the processor 108 implements an inverse zigzag scan that stores the rows of the block 37 in even-odd-separated order. Since the processor 108 performs the inverse zigzag scan anyway, this even-odd-separation technique adds no additional processing time. Conversely, execution of the map operation does add processing time.

Figure 17:
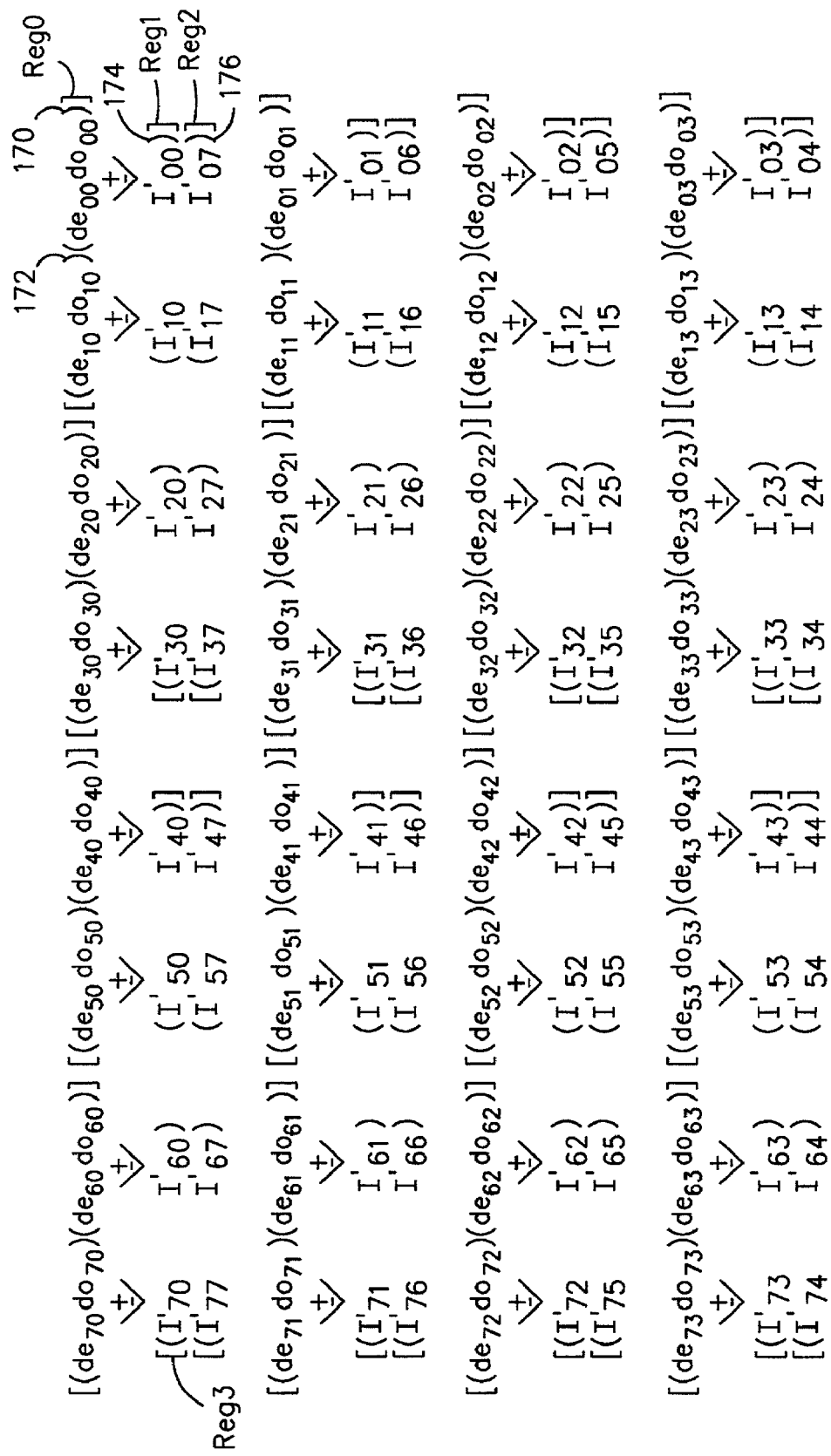
FIG. 17 illustrates an implicit-matrix-transpose function that the processor of FIG. 13 executes according to an embodiment of the invention.
Figure 18:
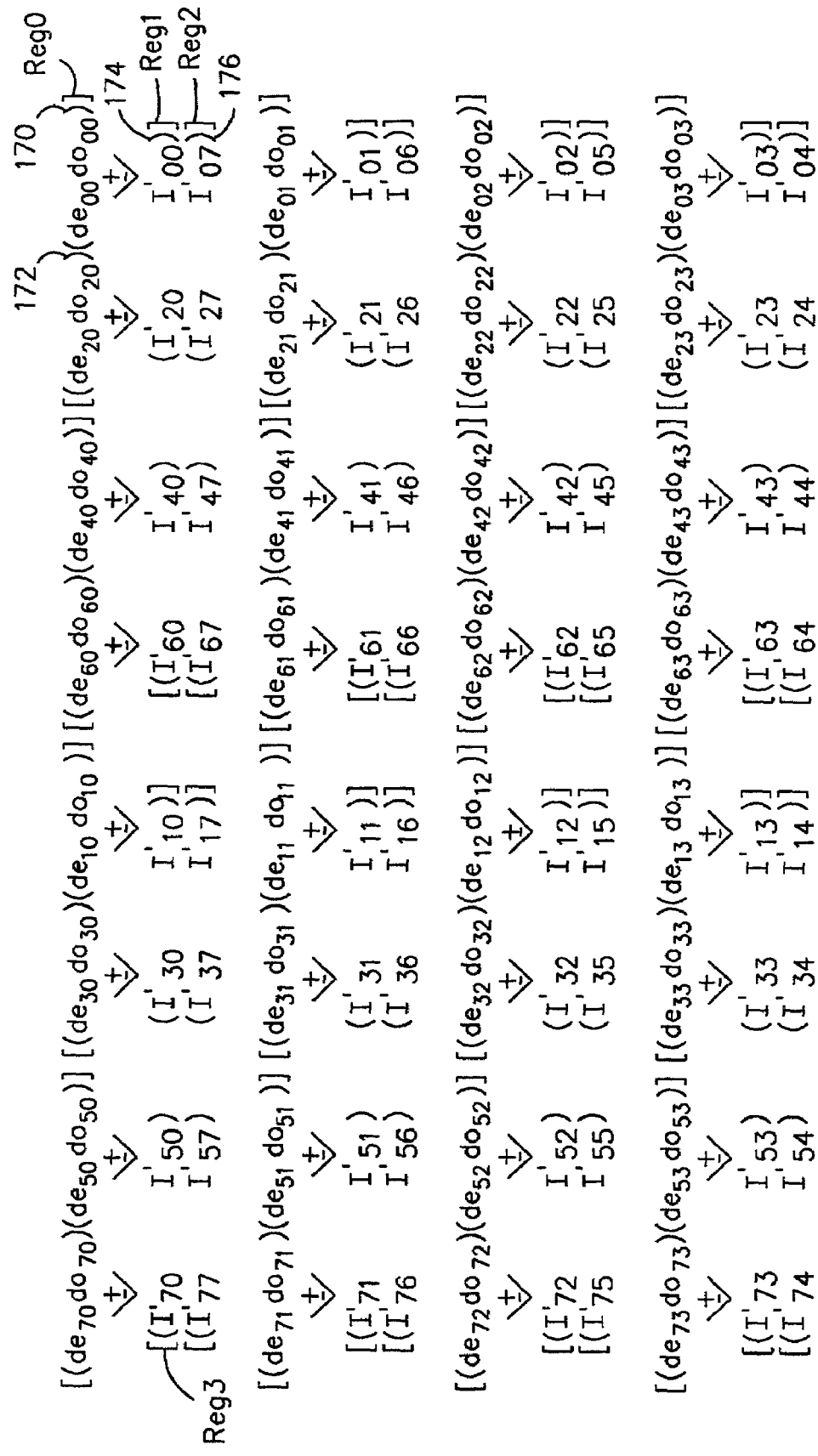
FIG. 18 illustrates an implicit-matrix-transpose-and-even-odd-separate function that the processor of FIG. 13 executes according to an embodiment of the invention.

FIGS. 17 and 18 illustrate techniques for storing the Masaki values such that the computing unit 112 generates the transposed block 86 (FIG. 9) or the transposed and even-odd separated block 88 (FIG. 10) directly from the pair-wise add and subtract and divide-by-two operations that the unit 112 performs on the Masaki values. Thus, these techniques save significant processing time as compared to prior techniques that perform the re-ordering (blocks 82 and 84 of FIGS. 7 and 8, respectively), transposing, and even-odd separating as separate steps.

FIG. 17 illustrates an implicit block transpose that the computing unit 112 performs according to an embodiment of the invention. As discussed above, this implicit transpose allows the unit 112 to generate the transposed block 86 (FIG. 9) of values I' directly from the pair-wise add and subtract and the divide-by-two operations (equations (13) and (14)). The brackets represent 64-bit registers of the register file 120a, and the parentheses represent respective 32-bit partitions of these registers. Furthermore, the dual subscripts of the Masaki values indicate their position within their own row and identify the row of transform values D from which they were generated. For example, $de_{00}$ is the first even Masaki value in the row of Masaki values, i.e., $QD_e$, that were generated from the first row of transform values $D_{00}$–$D_{07}$ of the block 37 (FIG. 3). Similarly, $de_{10}$ is the first even Masaki value in the row of Masaki values that were generated from the second row of transform values $D_{10}$–$D_{17}$ of the block 37.

Still referring to FIG. 17, the computing unit 112 implicitly generates the transposed block 86 (FIG. 9) by storing the combinations of de and do generated by the 4-point-vector-product operation in the proper 32-bit partitions of the registers Reg. Specifically, as discussed above in conjunction with FIG. 16, the clusters 114a and 114b stores corresponding pairs of de and do in respective 32-bit register partitions. The half sum (generated by the pair-wise add and divide-by-two operations) of a pair produces one intermediate or final inverse-transform value, and the half difference (generated by the pair-wise subtract and divide-by-two operations) of the same pair produces another intermediate or final inverse-transform value. For example, the unit 112 stores $do_{00}$ and $de_{00}$ in a 32-bit partition 170 of a register Reg0 and stores $do_{10}$ and $de_{10}$ in a second partition 172 of the Reg0. Thus, their respective half sums generates $I'_{00}$ and $I'_{10}$, and their respective half differences generate $I'_{07}$ and $I'_{17}$. Referring to FIG. 9, these are the first and second values I' in the first and last rows, respectively, of the transposed block 86. Because it is desired to store values in the same row in the same registers, the unit 112 stores $I'_{00}$ and $I'_{10}$ in a partition 174 of a register Reg1 and stores $I'_{07}$ and $I'_{17}$ in a partition 176 of a register Reg2. The unit 112 loads the other pairs of de and do into the partitions as shown, and performs the pair-wise add and subtract and divide-by-two operations to store the resulting intermediate inverse-transform values I' in respective registers as shown. Therefore, the unit 112 stores each half row of the transposed block 86 in a respective register. For example, the first half of the first row of the block 86, i.e., $I'_{00}$–$I'_{30}$, is stored in Reg1. Likewise, the last half of this first row i.e., $I'_{40}$–$I'_{70}$, is stored in a register Reg3. Thus, the unit 112 effectively transposes the block 84 (FIG. 8) to generate the block 86 during the same cycles that it generates the values I'. Because the unit 112 calculates and stores the values I' anyway, the unit 112 performs the implicit transpose with no additional cycles.

Next, the computing unit 112 executes the map operation to even-odd separates the rows of the block 86 (FIG. 9) and thus generate the transposed even-odd-separated block 88 (FIG. 10).

FIG. 18 illustrates an implicit block transpose and even-odd separation that the computing unit 112 performs according to an embodiment of the invention. This implicit transpose and even-odd separation allows the unit 112 to generate the transposed and even-odd separated block 88 (FIG. 10) of values I' directly from the pair-wise add and subtract and the divide-by-two operations (equations (13) and (14)).

Specifically, the technique described in conjunction with FIG. 18 is similar to the technique described above in conjunction with FIG. 17 except that the Masaki values are stored in a different order than they are in FIG. 17. For example, the unit 112 stores $do_{00}$ and $de_{00}$ in the 32-bit partition 170 of Reg0 and stores $do_{20}$ and $de_{20}$ in the second partition 172 of Reg0. Thus, their respective half sums generates $I'_{00}$ and $I'_{20}$, and their respective half differences generate $I'_{07}$ and $I'_{27}$. Referring to FIG. 10, these are the first and second values I' in the first and last rows, respectively, of the transposed block 88. Because it is desired to store values in the same row in the same registers, the unit 112 stores $I'_{00}$ and $I'_{20}$ in the partition 174 of Reg1 and stores $I'_{07}$ and $I'_{27}$ in the partition 176 of Reg2. The unit 112 loads the other pairs of de and do into the partitions as shown, and performs the pair-wise add and subtract and divide-by-two operations to store the resulting intermediate inverse-transform values I' in respective registers as shown. Therefore, the unit 112 stores each half row of the transposed block 88 in a respective register. For example, the first half of the first row of the block 88, i.e., $I'_{00}$, $I'_{20}$, $I'_{40}$, and $I'_{60}$, is stored in Reg1. Likewise, the last half of this first row i.e., $I'_{10}$, $I'_{30}$, $I'_{50}$, and $I'_{70}$, is stored in Reg3. Thus, the unit 112 effectively transposes and even-odd separates the block 84 (FIG. 8) to generate the block 88 during the same cycles that it generates the values I'. Because the unit 112 calculates and stores the values I' anyway, the unit 112 performs the implicit transposing and even-odd separating with no additional cycles.

Referring to FIGS. 17 and 18, after the computing unit 112 (FIG. 13) generates the block 88 (FIG. 10), it replaces the rows of values D in equation (12) with the rows of the block 88, and generates the block 90 (FIG. 11) of final inverse-transform values in accordance with equation (14). The unit 112 then executes the map operation to re-order the rows of the block 90 to generate the rows of the block 37 (FIG. 3). The processor 108 (FIG. 12) then stores the block 37 with the other decoded blocks of the image being decoded.

From the foregoing it will be appreciated that, although specific embodiments of the invention have been described herein for purposes of illustration, various modifications may be made without deviating from the spirit and scope of the invention. For example, the above-described techniques may be used to speed up a DCT.

What is claimed:

1. An image decoder, comprising:
a memory having rows of storage locations; and
a processor coupled to the memory and operable to,
store in a row of the memory intermediate values from first and second matrix columns,
combine the stored intermediate values within the row to generate resulting values for third and fourth matrix columns, and
store the resulting values in respective rows of the memory.

2. The image decoder of claim 1 wherein the intermediate values comprise Masaki values.

3. The image decoder of claim 1, wherein:
the memory comprises first, second, and third rows of storage locations; and
the processor is operable to,
store the intermediate values in the first row of storage locations,
store a first of the resulting values in the second row of storage locations, and
store a second of the resulting values in the third row of storage locations.

4. The image decoder of claim 1 wherein the processor is operable to generate the intermediate values.

5. The image decoder of claim 1 wherein the resulting values comprise respective partial inverse-transform values.

6. An image decoder, comprising:
a memory;
a processor coupled to the memory and operable to,
store a column of intermediate values in the memory as a row of intermediate values,
combine the intermediate values within the stored row to generate a column of resulting values, and
store the resulting values in the memory as a row of resulting values;
wherein the intermediate values comprise an even-position even intermediate value, an odd-position even intermediate value, an even-position odd intermediate value, and an odd-position odd intermediate value;
wherein the row has storage locations; and
wherein the processor is operable to store,
the even-position even intermediate value and the even-position odd intermediate value in respective adjacent storage locations, and
the odd-position even intermediate value and odd-position odd intermediate value in respective adjacent storage locations.

7. An image decoder, comprising:
a memory;
a processor coupled to the memory and operable to,
store a column of intermediate values in the memory as a row of intermediate values,
combine the intermediate values within the stored row to generate a column of resulting values, and
store the resulting values in the memory as a row of resulting values;
wherein the intermediate values comprise an even-position even intermediate value, an odd-position even intermediate value, an even-position odd intermediate value, and an odd-position odd intermediate value;
wherein the row has storage locations; and
wherein the processor is operable to store,
the even-position even intermediate value and the even-position odd intermediate value in a first pair of adjacent storage locations, the second pair of storage locations being adjacent to the first pair of adjacent storage locations.

8. An image decoder, comprising:
a memory;
a processor coupled to the memory and operable to,
store a column of intermediate values in the memory as a row of intermediate values,
combine the intermediate values within the stored row to generate a column of resulting values, and
store the resulting values in the memory as a row of resulting values;
wherein the intermediate values comprise a first even-position even intermediate value, an odd-position even intermediate value, a second even-position even intermediate value, a first even-position odd intermediate value, an odd-position odd intermediate value, and a second even-position odd intermediate value;
wherein the row has storage locations; and
wherein the processor is operable to store,
the first even-position even intermediate value and the first even-position odd intermediate value in a first pair of adjacent storage locations,
the second even-position even intermediate value and the second even-position odd intermediate value in a second pair of adjacent storage locations, the second pair of storage locations being adjacent to the first pair of storage locations, and
the odd-position even intermediate value and the odd-position odd intermediate value in a third pair of adjacent storage locations.

9. An image decoder, comprising:
memory rows; and
a processor couple to the memory rows and operable to,
combine a first matrix column of first values with a second matrix column of second values to generate a portion of a resulting matrix column of resulting values; and
store the resulting values in more than one of the memory rows to convert the portion of the resulting matrix column into a corresponding portion of a resulting matrix row.

10. The image decoder of claim 9 wherein:
the first values comprise even Masaki values; and
the second values comprise odd Masaki values.

11. The image decoder of claim 9 wherein the processor is further operable to store the first and second values of the first and second matrix columns in more than one of the memory rows.

12. The image decoder of claim 9 wherein the processor is operable to combine the first matrix column of first values with the second column of second values by adding the first values to the second values.

13. The image decoder of claim 9 wherein the processor is operable to combine the first matrix column of first values with the second matrix column of second values by subtracting the first values from the second values.

14. The image decoder of claim 9 wherein the processor is operable to generate the first matrix column of first values and the second matrix column of second values.

15. The image decoder of claim 9 wherein the resulting values comprise inverse-discrete-cosine-transform values.

16. The image decoder of claim 9 wherein an arrangement of the resulting values within the resulting matrix row is different than an arrangement of the resulting values within the resulting matrix column.

17. The image decoder of claim 9 wherein an arrangement of the resulting values within the resulting matrix row is the same as an arrangement of the resulting values within the resulting matrix column.

18. The image decoder of claim 9 wherein each of the memory rows comprises a single respective register.

19. The image decoder of claim 9 wherein:
the portion of the resulting matrix column comprises the entire matrix column; and
the portion of the resulting matrix row comprises the entire matrix row.

20. An image decoder, comprising:
first and second memory registers having respective storage locations; and
a processor coupled to the registers and operable to,
store each of a set of first intermediate values in every other respective storage location of the first memory register, the set of the first intermediate values corresponding to a set of initial values,
store each of a set of second intermediate values in remaining storage locations of the first memory register, the set of second intermediate values corresponding to the set of initial values,
combine each first intermediate value with a second intermediate value that occupies a respective adjacent storage location to generate respective resulting values; and
store each of the resulting values in a respective storage location of the second memory register.

21. The image decoder of claim 20 wherein:
the first intermediate values comprise even Masaki values; and
the second intermediate values comprise odd Masaki values.

22. The image decoder of claim 20 wherein the set of initial values comprises a block of discrete-cosine-transform coefficients.

23. The image decoder of claim 20 wherein:
the set of first intermediate values corresponds to a first subset of the set of initial values; and
the set of second intermediate values corresponds to a second subset of the set of initial values.

24. The image decoder of claim 20 wherein:
the set of initial values comprises rows of discrete-cosine-transform coefficients;
each of the first intermediate values corresponds to the discrete-cosine-transform coefficients tat occupy even locations of a respective row; and
each of the second intermediate values corresponds to the discrete-cosine-transform coefficients that occupy odd locations of the respective row.

25. The image decoder of claim 15 wherein:
the set of initial values comprises rows of discrete-cosine-transform coefficients, each row having respective even and odd locations;
the processor is operable to generate each of the first intermediate values from the discrete-cosine-transform coefficients that occupy even locations of a respective row; and the processor is operable to generate each of the second intermediate values from the discrete-cosine-transform coefficients that occupy odd locations of the respective row.

26. The image decoder of claim 20 wherein the processor is operable to combine each first intermediate value with a second intermediate value by adding each first intermediate value to the second intermediate value tat occupies the respective adjacent storage location.

27. The image decoder of claim 20 wherein the processor is operable to combine each first intermediate value with a second intermediate value by subtracting each first intermediate value from the second intermediate value that occupies the respective adjacent storage location.

28. The image decoder of claim 20 wherein the processor is operable to:
store each of the set of first intermediate values by storing first and second ones of the first intermediate values in first and third storage locations, respectively, of the first memory register;
store each of the set of second intermediate values by storing first and second ones of the second intermediate values in second and fourth storage locations, respectively, of the first memory register;
combine each first intermediate value with a second intermediate value by combining the first and second ones of the first intermediate values with the first and second ones, respectively, of the second intermediate values to generate respective first and second resulting values; and
store each of the resulting values by storing first and second resulting values in first and second locations, respectively, of the second memory register.

29. The image decoder of claim 20 wherein the processor is operable to:
store each of the set of first intermediate values by storing first and third ones of the first intermediate values in first and third storage locations, respectively, of the first memory register;
store each of the set of second intermediate values by storing first and third ones of the second intermediate values in second and fourth storage locations, respectively, of the first memory register;
combine each first intermediate value with a second intermediate value by combining the first and third ones of the first intermediate values with the first and third ones, respectively, of the second intermediate values to generate respective first and second resulting values; and
store each of the resulting values by storing first and second resulting values in first and second locations, respectively, of the second memory register.

30. A method comprising:
storing in a row of a memory intermediate values from first and second matrix columns;
generating resulting values for third and fourth matrix columns by combining the stored intermediate values within the row; and
storing the resulting values in respective rows of the memory.

31. The method of claim 30 wherein the intermediate values comprise Masaki values.

32. The method of claim 30, further comprising generating the first and second matrix columns of intermediate values.

33. A method comprising:
storing a column of intermediate values as a row of intermediate values;
generating a column of resulting values by combining the intermediate values within the stored row;
storing the resulting values as a row of resulting values;
wherein the intermediate values include an even-position even intermediate value, and odd-position odd intermediate value; and
wherein the storing the column of intermediate value comprises,
  storing the even-position even intermediate value and the even-position odd intermediate value in respective adjacent storage locations of a row, and
  storing the odd-position even intermediate value and the odd-position odd intermediate value in other respective adjacent storage locations of the row.

34. A method comprising:
storing a column of intermediate values as a row of intermediate values;
generating a column of resulting values by combining the intermediate values within the stored row;
storing the resulting values as a row of resulting values;
wherein the intermediate values include an even-position odd intermediate value, and an odd-position even intermediate value, and even-position odd intermediate value, and an odd-position odd intermediate value; and
wherein the storing the column of intermediate values comprises:
  storing the even-position even intermediate value and the even-position odd intermediate value in a second pair of adjacent storage locations, the second pair of storage locations being adjacent to the first pair of adjacent storage locations.

35. A method, comprising:
storing a column of intermediate values as a row of intermediate values;
generating a column of resulting values by combining the intermediate values within the stored row;
storing the resulting values as a row of resulting values
wherein the intermediate values include a first even-position even intermediate value, an odd-position even intermediate value, a second even-position even intermediate value, a first even-position odd intermediate value, and odd-position odd intermediate value, and a second even-position odd intermediate value; and
wherein the storing the column of intermediate values comprises,
  storing the first even-position even intermediate value and the first even-position odd intermediate value in a first pair of adjacent storage locations,
  storing the second even-position even intermediate value and the second even-position odd intermediate value in a second pair of adjacent storage locations, the second pair of storage locations being adjacent to the first pair of storage locations, and
  storing the odd-position even intermediate value and the odd-position odd intermediate value in a third pair of adjacent storage locations.

36. A method, comprising:
combining a first matrix column of first values with a second matrix column of second values to generate a portion of a resulting matrix column of resulting values; and
storing the resulting values in more than one row of a memory to convert the portion of the resulting matrix into a corresponding portion of a resulting matrix row.

37. The method of claim 36 wherein:
the first values comprise even Masaki values; and
the second values comprise odd Masaki values.

38. The method of claim 36, further comprising storing the first and second values of the first and second matrix columns in more than one row of the memory.

39. The method of claim 36 wherein the combining comprises adding the first values to the second values.

40. The method of claim 36 wherein the combining comprises subtracting the first values from the second values.

41. The method of claim 36, further comprising:
generating the first matrix column of first values; and
generating the second matrix column of second values.

42. The method of claim 36 wherein the resulting values comprise inverse-discrete-cosine-transform values.

43. A method, comprising:
storing each of a set of first intermediate values in every other respective storage location of a first memory register, the set of first intermediate values corresponding to a set of initial values;
storing each of a set of second intermediate values in remaining storage locations of the first memory register, the set of second intermediate values corresponding to the set of initial values;
generating respective resulting values by combining each first intermediate value with a second intermediate value that occupies a respective adjacent storage location of the first memory register; and
storing each of the resulting values in a respective storage location of a second memory register.

44. The method of claim 43 wherein:
the first intermediate values comprise even Masaki values; and
the second intermediate values comprise odd Masaki values.

45. The method of claim 43 wherein the set of initial values comprises a block of discrete-cosine-transform coefficients.

46. The method of claim 43 wherein:
the set of first intermediate values corresponds to a first subset of the set of initial values; and
the set of second intermediate values corresponds to a second subset of the set of initial values.

47. The method of claim 43 wherein:
the set of initial values comprises rows of discrete-cosine-transform coefficients;
each of the first intermediate values corresponds to the discrete-cosine-transform coefficients that occupy even locations of a respective row; and
each of the second intermediate values corresponds to the discrete-cosine-transform coefficients that occupy odd locations of the respective row.

48. The method of claim 43, further comprising:
wherein the set of initial values comprises rows of discrete-cosine-transform coefficients, each row having respective even and odd locations;
generating each of the first intermediate values from the discrete-cosine-transform coefficients that occupy even locations of a respective row; and
generating each of the second intermediate values from the discrete-cosine-transform coefficients that occupy odd locations of the respective row.

49. The method of claim 43 wherein the generating comprises adding each first intermediate value to the second intermediate value that occupies the respective adjacent storage location of the first memory register.

50. The method of claim 43 wherein the generating comprises subtracting each first intermediate value from the second intermediate value that occupies the respective adjacent storage location of the first memory register.

51. The method of claim 43 wherein:
- the storing the first intermediate value comprises storing first and second ones of the first intermediate values in first and third storage locations, respectively, of the first memory register;
- the storing the second intermediate values comprises storing first and second ones of the second intermediate values in second and fourth storage locations, respectively, of the first memory register;
- the generating comprises combining the first and second ones of the first intermediate values with the first and second ones, respectively, of the second intermediate values to generate respective first and second resulting values; and
- the storing the resulting values comprises storing the first and second resulting values in first and second locations, respectively, of the second memory register.

52. The method of claim 43 wherein:
- the storing the first intermediate values comprises storing first and third ones of the first intermediate values in first and third storage locations, respectively, of the first memory register;
- the storing the second intermediate values comprises first and third ones of the second intermediate values in second and fourth storage locations, respectively, of the first memory register;
- the generating comprises combining the first and third ones of the first intermediate values with the first and third ones, respectively, of the second intermediate values to generate respective first and second resulting values; and
- the storing the resulting values comprises storing the first and second resulting values in first and second locations, respectively, of the second memory register.

* * * * *